United States Patent
Nakata et al.

(10) Patent No.: US 6,429,916 B1
(45) Date of Patent: Aug. 6, 2002

(54) LIQUID CRYSTAL DISPLAY WITH FILTER AND LIGHT SHIELD SEPARATED FROM CONTACT HOLE

(75) Inventors: Shinichi Nakata; Yuji Yamamoto; Mamoru Okamoto; Michiaki Sakamoto; Takahiko Watanabe; Hirofumi Ihara; Hironori Kikkawa; Muneo Maruyama, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/459,010

(22) Filed: Dec. 10, 1999

(30) Foreign Application Priority Data

Dec. 10, 1998 (JP) .......................................... 10-351637
Jul. 12, 1999 (JP) .......................................... 11-197741

(51) Int. Cl.$^7$ ............................................ G02F 1/1335
(52) U.S. Cl. ...................................... 349/106; 349/110
(58) Field of Search ................................ 349/106, 110, 349/138, 122, 43; 438/30

(56) References Cited

U.S. PATENT DOCUMENTS

| | | | |
|---|---|---|---|
| 5,172,256 A | | 12/1992 | Sethofer |
| 5,724,109 A | * | 3/1998 | Nakamura et al. ............. 349/79 |
| 5,943,107 A | * | 8/1999 | Kadoto et al. ................. 349/44 |
| 6,195,139 B1 | * | 2/2001 | Yamazaki et al. ............. 349/43 |
| 6,198,520 B1 | * | 3/2001 | Kondo et al. ................ 349/141 |
| 6,330,043 B1 | * | 12/2001 | Kikkawa et al. ............... 349/43 |

FOREIGN PATENT DOCUMENTS

| | | |
|---|---|---|
| JP | 10-39292 | 2/1998 |
| KR | 95-12112 | 5/1995 |

* cited by examiner

Primary Examiner—Kenneth Parker
(74) Attorney, Agent, or Firm—Katten Muchin Zavis Rosenman

(57) ABSTRACT

A liquid crystal display device comprises a transparent insulator substrate, switching elements which are formed on the transparent insulator substrate, a passivation layer for passivating the switching elements, color filters of prescribed colors which are formed on the passivation layer so that no color filter will be formed in areas around contact holes, black matrixes as shields for preventing light leakage which are formed on the passivation layer after the formation of the color filters so as to cover at least the switching elements and so that no black matrix will be formed in areas around the contact holes, an overcoat layer which is formed on the color filters and the black matrixes, pixel electrodes formed on the overcoat layer, lead electrodes of the switching elements for being connected to corresponding pixel electrodes, and contact holes which are formed through the overcoat layer and the passivation layer for establishing connection between the pixel electrodes and lead electrodes of the switching elements. The black matrixes are formed so that the edge of the black matrix touching the edge of the color filter will be superposed on the edge of the color filter.

40 Claims, 18 Drawing Sheets

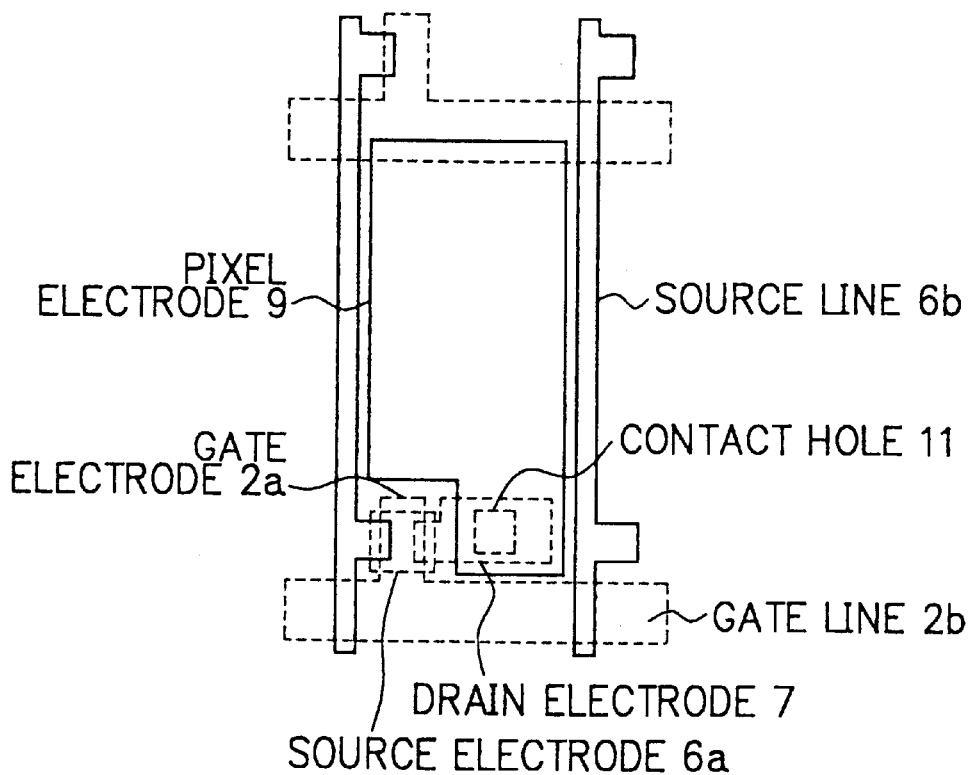

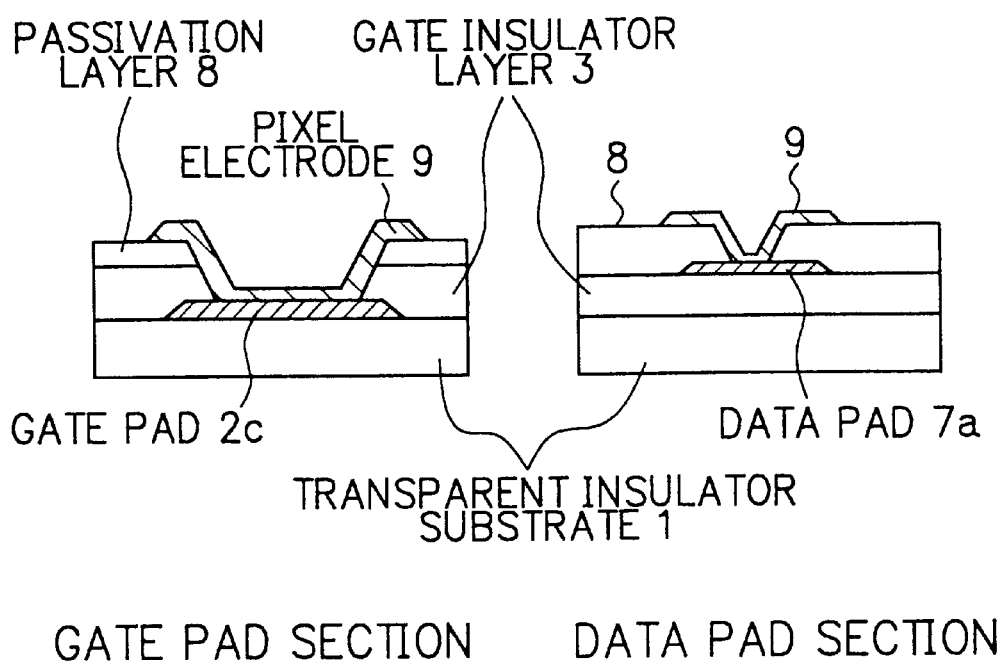

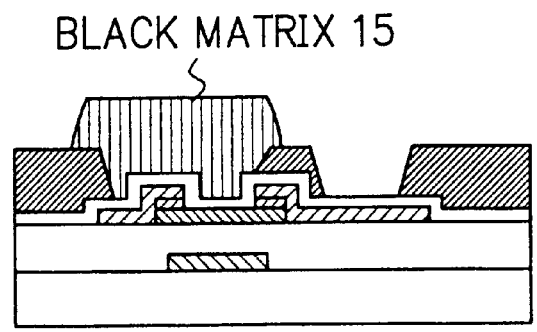
F I G. 13A
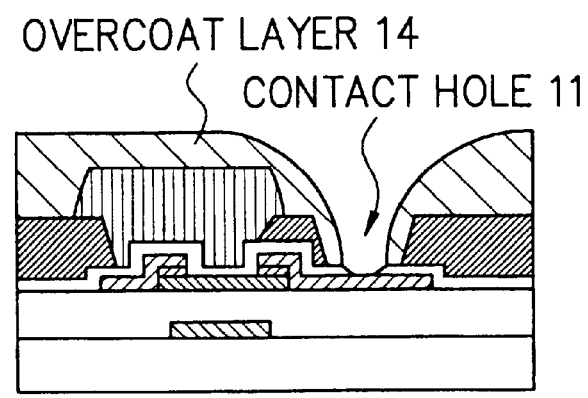
F I G. 13B
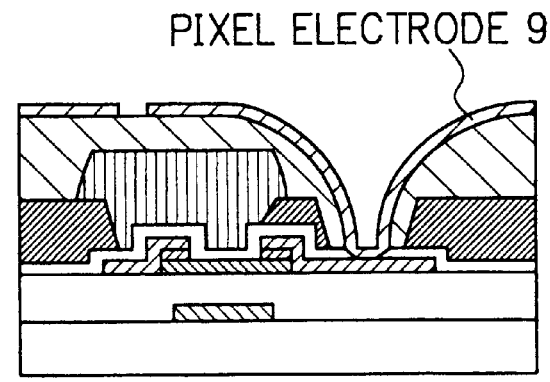
F I G. 13C

LIQUID CRYSTAL DISPLAY WITH FILTER AND LIGHT SHIELD SEPARATED FROM CONTACT HOLE

BACKGROUND OF THE INVENTION

The present invention relates to a liquid crystal display device including color filters and switching elements such as TFTs (Thin-Film Transistors) which are formed on a common substrate, and a manufacturing method of the liquid crystal display device.

Description of the Prior Art

FIG. 1 is a schematic plan view showing a channel-etched type TFT which is formed on an active matrix substrate of a conventional liquid crystal display device, in which the layout of a pixel is a shown. FIG. 2 is a cross sectional view of the TFT of FIG. 1. FIGS. 3A and 3B are cross sectional views of pads of the TFT of FIGS. 1 and 2, in which FIG. 3A shows a gate pad section and FIG. 3B shows a data pad section.

Referring to FIG. 2, a gate electrode 2a is formed on a transparent insulator substrate 1, and a gate insulator layer 3 is deposited so as to cover the transparent insulator substrate 1 and the gate electrode 2a. On the gate insulator layer 3, a semiconductor layer 4 is formed so as to overlay on the gate electrode 2a. A source electrode 6a and a drain electrode 7, which are formed on different sides of the semiconductor layer 4, are respectively connected to the semiconductor layer 4 via an ohmic contact layer 5. Part of the deposited ohmic contact layer 5 between the source electrode 6a and the drain electrode 7 is removed by etching, and thus the ohmic contact layer 5 remains only between the source electrode 6a and the semiconductor layer 4 and between the drain electrode 7 and the semiconductor layer 4.

On the above structure, a passivation layer 8 is formed. On the passivation layer 8, a transparent conductive layer for becoming a pixel electrode 9 is deposited so as to be connected to the drain electrode 7 via a contact hole 11 through the passivation layer 8. A scanning signal is supplied to the gate electrode 2a via a gate line 2b, and a video signal is supplied to the source electrode 6a via a source line 6b, and thereby electric charges are written in the pixel electrode 9.

In the following, a manufacturing method of the active matrix substrate which has been shown in FIGS. 1 through 3B will be described referring to FIGS. 4A through 4E. Incidentally, only the part shown in FIG. 2 is shown in FIGS. 4A through 4E (and thus the gate pad section and the data pad section of FIGS. 3A and 3B are not shown). The following explanation will be given mainly with regard to one pixel.

First, as shown in FIG. 4A, a conductive layer of Al, Mo, Cr, etc. is deposited on the transparent insulator substrate 1 (formed of glass, for example) by sputtering to the thickness of 100~400 nm, and thereafter the first patterning step is executed so as to form the gate line 2b (unshown in FIG. 4A, shown in FIG. 1), the gate electrode 2a and a gate pad 2c (unshown in FIG. 4A, shown in FIG. 3A) (which is connected to an external display signal processor board) are formed by photo-lithography.

Subsequently, as shown in FIG. 4B, the gate insulator layer 3 (formed of silicon nitride), the semiconductor layer 4 (formed of amorphous silicon) and the ohmic contact layer 5 (formed of n+ amorphous silicon) are successively deposited by means of plasma CVD (Chemical Vapor Deposition) to the thicknesses of approximately 400 nm, 300 nm and 50 nm respectively, and thereafter the second patterning step is executed so as to pattern and form the semiconductor layer 4 and the ohmic contact layer 5 at once.

Subsequently, as shown in FIG. 4C, a layer of Mo, Cr, etc. is sputtered to the thickness of 100~200 nm so as to cover the gate insulator layer 3 and the ohmic contact layer 5, and thereafter the third patterning step is executed so as to pattern and form the source electrode 6a, the source line 6b, the drain electrode 7 and a data pad 7a (unshown in FIG. 4C, shown in FIG. 3B) (which is connected to the external display signal processor board) are formed by photo-lithography. Thereafter, unnecessary part of the ohmic contact layer 5 on the channel of the TFT is removed.

Subsequently, as shown in FIG. 4D, the passivation layer 8 (formed of an inorganic material such as silicon nitride) is deposited on the back channel of the TFT, the source electrode 6a, the source line 6b, the drain electrode 7 and the data pad 7a (unshown in FIG. 4D, shown in FIG. 3B) by means of plasma CVD to the thickness of approximately 100~200 nm, and thereafter the fourth patterning step is executed so as to form the contact hole 11 (for the connection of the drain electrode 7 and the pixel if electrode 9) and remove unnecessary part of the passivation layer 8 on the data pad 7a (unshown in FIG. 4D, shown in FIG. 3B) and remove unnecessary parts of the gate insulator layer 3 and the passivation layer 8 on the gate pad 2c (unshown in FIG. 4D, shown in FIG. 3A).

Finally, as shown in FIG. 4E, the transparent conductive layer for becoming the pixel electrode 9 is deposited by sputtering so as to be connected to the drain electrode 7 via the contact hole 11 through the passivation layer 8, and thereafter the fifth patterning step is executed so as to pattern and form the pixel electrode 9.

As explained above, the active matrix substrate which has been shown in FIG. 4A through FIG. 4E can be manufactured by only five patterning steps, therefore, the manufacturing process can be shortened considerably. A liquid crystal display device is manufactured by coupling the substrate and another substrate (which is provided with color filters and electrodes thereon) together so as to sandwich liquid crystal.

However, in the above active matrix substrate, light leaks out between the gate line 2b and the pixel electrode 9 and between the source line 6b and the pixel electrode 9 as can be seen in the plan view of FIG. 1. Therefore, the light leakage has to be shielded by providing a black matrix (or black matrixes) to the color filter substrate (that is, the aforementioned "another substrate"). In consideration of the precision of the placement of the color filter substrate on the active matrix substrate, the light shielding area of the black matrixes has to be made considerably large, thereby the opening area ratio of the liquid crystal display device is necessitated to be small, and thereby the usage efficiency of the back light of the liquid crystal display device has to be lowered.

In order to enlarge the opening area ratio of the liquid crystal display device, a structure (CF on TFT structure) and a manufacturing method of a liquid crystal display device, in which the color filters are formed directly on the active matrix substrate, have been proposed in, for example, the first embodiment of Japanese Patent Application Laid-Open No.HEI10-39292. If we add some necessary conditions etc. which have not been mentioned in the document, the actual manufacturing method of the CF on TFT structure according to the document becomes as follows.

FIGS. 5A through 5H are cross sectional views showing the manufacturing method of the CF on TFT structure according to the above document. The TFT shown FIG. 5A is called a "channel protection TFT". Incidentally, the following explanation will be given mainly with regard to one pixel.

First, as shown in FIG. 5A, a gate electrode 2a is formed on a transparent insulator substrate 1, and a gate insulator layer 3 is deposited so as to cover the transparent insulator substrate 1 and the gate electrode 2a. On the gate insulator layer 3, a semiconductor layer 4 is formed so as to overlay on the gate electrode 2a, and a source electrode 6a and a drain electrode 7 are formed to be connected to the semiconductor layer 4. After completing such a channel protection TFT 10b, a passivation layer 8 is deposited so as to cover the above structure.

Subsequently, as shown in FIG. 5B, a pigments-dispersed photoresist for becoming the black matrix 15 is coated on the passivation layer 8 by spin coating. The number of revolutions of the spin coater is controlled so that the thickness of the black matrix 15 will become approximately 1.5 $\mu$m. Thereafter the black matrix 15 is patterned by means of photo-lithography so as to overlay on the gate line 2b. By the patterning, the black matrix 15 is formed over the channel protection TFT 10b, and over a contact hole 11 (which will be formed later).

Subsequently, as shown in FIG. 5C, a red color photoresist (pigments-dispersed type) is coated on the black matrix 15 and the passivation layer 8 by spin coating to the thickness of approximately 1.2 $\mu$m, and thereafter a red color filter 13a is patterned to a predetermined pattern by means of photo-lithography. In this process, by the formation of the black matrixes 15 (The plural "black matrixes" means black matrixes corresponding to all the pixels of the liquid crystal display device.) before the coating of the red color photoresist, a dim residue of the red color photoresist (pigments) tends to occur on part of the passivation layer 8 where the black matrix photoresist has been removed, or a residue of the red color photoresist tends to occur due to change of the status of the surface of the passivation layer 8 by the formation and patterning of the black matrixes 15. Therefore, although not mentioned in the document (Japanese Patent Application Laid-Open No.HEI10-39292), a step for removing and cleaning a residue of the black matrix photoresist has to be executed before the coating of the red color photoresist. Concretely, the TFT substrate on which the black matrixes 15 have been formed and patterned is radiated with UV rays (of the luminous intensity of approximately 20 mW) for 60 sec, and the residue of the black matrix photoresist which has been broken down by the UV rays is removed by spin cleaning.

Subsequently, as shown in FIG. 5D-1, a green color photoresist (pigments-dispersed type) is coated by spin coating to the thickness of approximately 1.2 $\mu$m, and thereafter a green color filter 13b is patterned to a predetermined pattern by means of photo-lithography. Incidentally, similarly to the case of the formation of the red color filter 13a, a residue-removing step (for removing a residue of the red color photoresist) by use of the UV rays is necessary before the formation of the green color filter 13b.

Subsequently, as shown in FIG. 5D-2 (showing another pixel), a blue color photoresist (pigments-dispersed type) is coated by spin coating to the thickness of approximately 1.2 $\mu$m, and thereafter a blue color filter 13c is patterned to a predetermined pattern by means of photo-lithography. Incidentally, similarly to the cases of the formation of the red color filter 13a and the green color filter 13b, a residue-removing step (for removing a residue of the green color photoresist) by use of the UV rays is necessary before the formation of the blue color filter 13c.

Subsequently, as shown in FIG. 5E, an overcoat layer 14 is formed on the TFT substrate (on which the black matrixes 15, the red color filters 13a, the green color filters 13b and the blue color filters 13c have been formed) to the thickness of approximately 3 $\mu$m for flattening the surface of the TFT substrate. As the overcoat layer 14, an acrylic photoresist is used. After coating the overcoat layer 14 by spin coating, part of the overcoat layer 14 corresponding to the contact hole 11 is removed and opened by means of photo-lithography. Incidentally, although not mentioned in the document (Japanese Patent Application Laid-Open No.HEI10-39292), a residue-removing step (for removing a residue of the blue color photoresist) by use of the UV rays is also necessary before the formation of the overcoat layer 14.

Subsequently, as shown in FIG. 5F, a positive novolac photoresist 17 is coated and patterned on the overcoat layer 14, and thereafter part of the black matrix 15 corresponding to the contact hole 11 is removed and opened by means of dry etching using the novolac photoresist 17 as a mask.

Subsequently, as shown in FIG. 5G, part of the passivation layer 8 corresponding to the contact hole 11 is removed and opened by means of dry etching, and thereby the opening for the contact hole 11 is completed.

Finally, as shown in FIG. 5H, a transparent conductive layer for becoming a pixel electrode 9 is sputtered on the above structure, and the pixel electrode 9 is patterned to a predetermined pattern by means of photo-lithography, thereby connection between the pixel electrode 9 and the drain electrode 7 is established, and thereby the active matrix substrate of the CF (Color Filter) on TFT structure is completed.

However, when the present inventors examined the above manufacturing method of the CF on TFT structure, some problems were found in addition to the problem which has been mentioned referring to FIG. 5C. For example, although not mentioned in the document, in the step of FIG. 5F for forming the opening for the contact hole 11, the etching of the black matrix 15 and the passivation layer 8 after hardening has to be done by means of dry etching. The black matrix 15 has been formed with the thickness of approximately 1.5 $\mu$m so as to have enough light shielding effect. In order to etch the black matrix 15 using fluoride etching gas ($SF_6$, $CF_4$, $CHF_3$, etc.), an etching time of approximately 200~300 sec is necessary. Further, another etching time of approximately 100~150 sec is necessary for etching the passivation layer 8 which is formed of silicon nitride etc. Therefore, an etching time of approximately 300~450 sec is necessary for forming the contact hole opening through the black matrix 15 and the passivation layer 8 by means of dry etching even when the two dry etching steps are executed at once. Therefore, the above manufacturing method of the CF on TFT structure is not suitable for mass production.

Further, the generally used novolac photoresist 17 does not have enough resistance to such a long etching time. Especially, if the etching of the black matrix 15 is not executed completely, some of the passivation layer 8 might remain in the contact hole 11 since the etching condition of the passivation layer 8 differs from that of the black matrix 15, thereby contact resistance of the contact hole 11 might be increased.

To resolve the above problems, it is also possible to preliminarily remove parts of the black matrixes 15 corresponding to the contact holes 11 at the same time as the first patterning of the black matrixes 15. Such a manufacturing method of the CF on TFT structure will be explained below referring to FIGS. 6A through 6G. Incidentally, the following explanation will be given mainly with regard to one pixel.

First, as shown in FIG. 6A, a channel protection TFT 10b is formed on a transparent insulator substrate 1, and a passivation layer 8 is deposited so as to cover the above structure.

Subsequently, as shown in FIG. 6B, a pigments-dispersed photoresist (for becoming the black matrixes 15) is coated on the passivation layer 8 by spin coating. The number of revolutions of the spin coater is controlled so that the thickness of the black matrix 15 will become approximately 1.5 μm. Thereafter the black matrix 15 is patterned by means of photo-lithography so as to overlay on the gate line 2b. By the patterning, the black matrix 15 is formed over the channel protection TFT 10b, however, not formed over a contact hole 11 (which will be formed later).

Subsequently, as shown in FIG. 6C, a red color photoresist (pigments-dispersed type) is coated on the black matrix 15 and the passivation layer 8 by spin coating to the thickness of approximately 1.2 μm, and thereafter a red color filter 13a is patterned to a predetermined pattern by means of photo-lithography. In this process, by the formation of the black matrixes 15 before the coating of the red color photoresist, a dim residue of the red color photoresist (pigments) tends to occur on part of the passivation layer 8 where the black matrix photoresist has been removed, or a residue of the red color photoresist tends to occur due to change of the status of the surface of the passivation layer 8 by the formation and patterning of the black matrixes 15. Therefore, a step for removing and cleaning a residue of the black matrix photoresist has to be executed before the coating of the red color photoresist. Concretely, the TFT substrate on which the black matrixes 15 have been formed and patterned is radiated with UV rays (of the luminous intensity of approximately 20 mW) for 60 sec, and the residue of the black matrix photoresist which has been broken down by the UV rays is removed by spin cleaning.

Subsequently, as shown in FIG. 6D, a green color photoresist (pigments-dispersed type) is coated by spin coating to the thickness of approximately 1.2 μm, and thereafter a green color filter 13b is patterned to a predetermined pattern by means of photo-lithography. Incidentally, similarly to the case of the formation of the red color filter 13a, a residue-removing step (for removing a residue of the red color photoresist) by use of the UV rays is necessary before the formation of the green color filter 13b. Subsequently, a blue color filter 13c is also formed and patterned to a predetermined pattern in a similar manner.

Subsequently, as shown in FIG. 6E, an overcoat layer 14 is formed on the TFT substrate (on which the black matrixes 15, the red color filters 13a, the green color filters 13b and the blue color filters 13c have been formed) to the thickness of approximately 3 μm for flattening the surface of the TFT substrate. As the overcoat layer 14, an acrylic photoresist is used. After coating the overcoat layer 14 by spin coating, part of the overcoat layer 14 corresponding to the contact hole 11 is removed and opened by means of photo-lithography. Incidentally, although not mentioned in the document (Japanese Patent Application Laid-Open No.HEI10-39292), a residue-removing step (for removing a residue of the blue color photoresist) by use of the UV rays is also necessary before the formation of the overcoat layer 14.

Subsequently, as shown in FIG. 6F, a positive novolac photoresist 17 is coated and patterned on the overcoat layer 14, and thereafter part of the passivation layer 8 corresponding to the contact hole 11 is removed and opened by means of dry etching using the novolac photoresist 17 as a mask.

Finally, as shown in FIG. 6G, a transparent conductive layer for becoming a pixel electrode 9 is sputtered on the above structure, and the pixel electrode 9 is patterned to a predetermined pattern by means of photo-lithography, thereby connection between the pixel electrode 9 and the drain electrode 7 is established, and thereby the active matrix substrate of the CF on TFT structure is completed.

However, in this manufacturing method of the CF on TFT structure, the parts of the black matrixes 15 corresponding to the contact holes 11 are removed when the black matrixes 15 are developed and patterned by means of photo-lithography as shown in FIG. 6B. Therefore, some residue of the black matrix photoresist remains on the parts of the passivation layer 8 corresponding to the contact holes 11. The residue of the black matrix photoresist can be removed to some extent by radiation of UV rays, however, in the subsequent formation steps of the red color filters 13a, the green color filters 13b and the blue color filters 13c, residues of the red, green and blue color photoresists occur, growing from the faint residue of the black matrix photoresist, thereby the etching of the parts of the passivation layer 8 corresponding to the contact holes 11 is made impossible.

It is of course possible to increase the UV radiation time or the luminous intensity of the UV rays in order to resolve the above problem by enhancing the effect of the UV radiation in the steps after the formation of the black matrixes 15. However, by the increase of the UV radiation time or the luminous intensity, decomposition of the black matrixes 15 progresses and thereby the resistance of the black matrix 15 is deteriorated. For example, an initial specific resistance of $10^{12}$ Ω·cm of the black matrix 15 is decreased to $10^{11}$ Ω·cm by UV radiation of 60 sec. By another 60 sec UV radiation, the specific resistance is decreased to as low as $10^{10}$ Ω·cm. The phenomenon continues proportionally to the UV radiation time. Such effect also occurs by the increase of the luminous intensity of the UV rays proportionally to the luminous intensity.

By the decrease of the resistance of the black matrix 15, the coupling capacitance between the black matrix 15 and source lines 6b is increased, thereby delay occurs in signals which are supplied to the drain electrode 7. According to a simulation conducted by the present inventors, the signal delay occurs when the specific resistance of the black matrix 15 is decreased to approximately $10^6$ Ω·cm.

Further, a high OD (Optical Density) black matrix photoresist having strong light shielding effect has to be employed for the black matrixes 15. The black matrix photoresist is a negative photoresist which is composed of base resin (such as acrylic acid resin) and carbon dispersed in the base resin. The high OD black matrix photoresist scarcely passes light, and thus photo-polymerization of the photoresist in exposure process occurs mainly on the surface only even if the amount of exposure is increased, therefore, side walls of the black matrixes 15 tend to be dissolved by the developing solution in the development process. Therefore, the tolerances of the developing time and the developing solution concentration are necessitated to be small, thereby the result of the development process tends to vary. Concretely, the black matrixes 15 can not be patterned exactly to a predetermined pattern if the development is not enough. On the other hand, parts of the black matrixes 15 flake (strip) off from the surface of the passivation layer 8 if the development is executed excessively.

As described above, in conventional manufacturing methods of the CF (Color Filter) on TFT structure, the steps for forming the parts of the CF on TFT structure are generally executed in the order: the TFTs, the black matrixes, the color filters, the overcoat layer, the contact holes, and the pixel electrodes. By such an order (in which the color filters are formed after the formation of the black matrixes), the residues of the black matrix photoresist and the color filter photoresists tend to remain in the contact hole 11. Due to the residues, the etching of the passivation layer 8 for forming the openings for the contact holes 11 becomes impossible, and even if the contact hole 11 could successively formed, the resistance of the contact hole 11 is necessitated to become large.

If UV cleaning is executed hard in order to remove the large amount of residues, insulation coatings of carbon particles which are dispersed in the black matrix photoresist are destroyed, and thereby the resistance of the black matrix photoresist is decreased causing the signal delay.

Further, in the conventional manufacturing methods, side walls of the black matrixes 15 are fully exposed to the developing agent in the development process, and thus pattern flake-off of the black matrixes 15 tends to occur.

SUMMARY OF THE INVENTION

It is therefore the primary object of the present invention to provide a liquid crystal display device of on-array color filter structure (i.e. the CF (Color Filter) on TFT structure etc. in which switching elements (such as TFTs) and color filters are formed on a common substrate so as to have a large opening area ratio (a large usage efficiency of the back light)), in which the etching of the passivation layer 8 for forming the contact hole openings can be executed easily and reliably, the contact resistance of the contact hole 11 can be decreased, signal delay can be avoided by securing a large resistance of the black matrix 15, the pattern flake-off of the black matrixes 15 can be eliminated, and the light leakage can be eliminated correctly.

Another object of the present invention is to provide a manufacturing method of a liquid crystal display device, by which the liquid crystal display device having the above characteristics can be manufactured efficiently.

In accordance with a first aspect of the present invention, there is provided a liquid crystal display device comprising a transparent insulator substrate, switching elements, a passivation layer, color filters of prescribed colors, black matrixes, an overcoat layer, pixel electrodes, lead electrodes, and contact holes. The switching elements are formed on the transparent insulator substrate. The passivation layer is formed for passivating the switching elements. The color filters of prescribed colors are formed on the passivation layer so that no color filter will be formed in areas around contact holes. The black matrixes are formed as shields for preventing light leakage. The black matrixes are formed on the passivation layer after the formation of the color filters so as to cover at least the switching elements, and so that no black matrix will be formed in areas around the contact holes. The overcoat layer is formed on the color filters and the black matrixes. The pixel electrodes are formed on the overcoat layer. The lead electrode is provided to each of the switching elements for being connected to a corresponding one of the pixel electrodes. The contact holes are formed through the overcoat layer and the passivation layer for establishing connection between the pixel electrodes and lead electrodes of the switching elements.

In accordance with a second aspect of the present invention, in the first aspect, the black matrixes are formed so that the edge of the black matrix touching the edge of the color filter will be superposed on the edge of the color filter.

In accordance with a third aspect of the present invention, in the first aspect, the color filters are formed of pigments-dispersed photoresists.

In accordance with a fourth aspect of the present invention, in the third aspect, the pigments-dispersed photoresists which are used for forming the color filters are acrylic pigments-dispersed photoresists.

In accordance with a fifth aspect of the present invention, in the first aspect, the black matrixes are formed of a pigments-dispersed photoresist.

In accordance with a sixth aspect of the present invention, in the fifth aspect, the pigments-dispersed photoresist which is used for forming the black matrixes is an acrylic pigments-dispersed photoresist.

In accordance with a seventh aspect of the present invention, in the fifth aspect, carbon particles are employed as the pigments for the pigments-dispersed photoresist for the black matrixes.

In accordance with an eighth aspect of the present invention, in the fifth aspect, carbon particles provided with insulation coatings are employed as the pigments for the pigments-dispersed photoresist for the black matrixes.

In accordance with a ninth aspect of the present invention, in the fifth aspect, titanium oxide particles are employed as the pigments for the pigments-dispersed photoresist for the black matrixes.

In accordance with a tenth aspect of the present invention, in the first aspect, the overcoat layer is formed of a transparent photoresist.

In accordance with an eleventh aspect of the present invention, in the tenth aspect, the transparent photoresist is a transparent acrylic photoresist.

In accordance with a twelfth aspect of the present invention, in the first aspect, the switching element is a TFT (Thin-Film Transistor), and the lead electrode is the drain electrode of the TFT.

In accordance with a thirteenth aspect of the present invention, in the first aspect, the black matrixes are formed so as to be connected to each other across pixels which are arranged in a particular direction.

In accordance with a fourteenth aspect of the present invention, there is provided a manufacturing method of a liquid crystal display device, comprising a switching element formation step, a passivation layer formation step, a color filter formation step, a black matrix formation step, an overcoat layer formation step, a contact hole opening formation step, and a pixel electrode formation step. In the switching element formation step, switching elements, each of which has a lead electrode for being connected to a corresponding pixel electrode, are formed on a transparent insulator substrate. In the passivation layer formation step, a passivation layer for passivating the switching elements is formed on the substrate on which the switching elements have been formed. In the color filter formation step, color filters of prescribed colors are formed on the passivation layer to predetermined patterns so that no color filter will be formed in areas around contact holes. In the black matrix formation step, black matrixes, as shields for preventing light leakage, are formed on the substrate on which the color filters have been formed. The black matrixes are formed so as to cover at least the switching elements, and so that no black matrix will be formed in areas around the contact holes. In the overcoat layer formation step, an overcoat layer is formed on the substrate on which the color filters and the black matrixes have been formed. The overcoat layer is formed to a pattern having openings for the contact holes. In the contact hole opening formation step, openings for the contact holes are formed in the passivation layer by etching corresponding parts of the passivation layer. In the pixel electrode formation step, the pixel electrodes are formed on the overcoat layer by depositing a transparent conductive layer on the patterned overcoat layer and on parts of the lead electrodes which have been exposed in the contact hole openings and thereafter patterning the transparent conductive layer to a predetermined pattern.

In accordance with a fifteenth aspect of the present invention, in the black matrix formation step of the fourteenth aspect, the black matrixes are formed so that the edge of the black matrix touching the edge of the color filter will be superposed on the edge of the color filter.

In accordance with a sixteenth aspect of the present invention, in the contact hole opening formation step of the fourteenth aspect, the etching of the passivation layer is executed using a photoresist patterned on the overcoat layer as a mask.

In accordance with a seventeenth aspect of the present invention, in the contact hole opening formation step of the fourteenth aspect, the etching of the passivation layer is executed using the patterned and hardened overcoat layer as a mask.

In accordance with an eighteenth aspect of the present invention, in the seventeenth aspect, the etching of the passivation layer is executed by means of plasma etching using one or more selected from $SF_6$, He and $O_2$ as etching gasses.

In accordance with a nineteenth aspect of the present invention, in the fourteenth aspect, the color filter formation step for each prescribed color includes a photoresist coating step, a prebaking step, an exposure step, a development step, and a baking step.

In accordance with a twentieth aspect of the present invention, in the color filter formation step of the fourteenth aspect, the color filters are formed of pigments-dispersed photoresists.

In accordance with a twenty-first aspect of the present invention, in the twentieth aspect, the pigments-dispersed photoresists which are used for forming the color filters are acrylic pigments-dispersed photoresists.

In accordance with a twenty-second aspect of the present invention, in the fourteenth aspect, the black matrix formation step includes a photoresist coating step, a prebaking step, an exposure step, a development step, and a baking step.

In accordance with a twenty-third aspect of the present invention, in the twenty-second aspect, the exposure step is executed in a nitrogen gas atmosphere.

In accordance with a twenty-fourth aspect of the present invention, in the fourteenth aspect, the black matrix formation step includes a photoresist coating step, a prebaking step, an exposure step, a PEB (Post Exposure Bake) step, a development step, and a baking step.

In accordance with a twenty-fifth aspect of the present invention, in the twenty-fourth aspect, the exposure step is executed in a nitrogen gas atmosphere.

In accordance with a twenty-sixth aspect of the present invention, in the fourteenth aspect, the black matrix formation step includes a photoresist coating step, a first prebaking step, an oxygen passivation layer coating step, a second prebaking step, an exposure step, a PEB (Post Exposure Bake) step, an oxygen passivation layer removing step, a development step, and a baking step.

In accordance with a twenty-seventh aspect of the present invention, in the twenty-sixth aspect, the exposure step is executed in a nitrogen gas atmosphere.

In accordance with a twenty-eighth aspect of the present invention, in the twenty-sixth aspect, the oxygen passivation layer is formed of polyvinyl alcohol resin.

In accordance with a twenty-ninth aspect of the present invention, in the black matrix formation step of the fourteenth aspect, the black matrixes are formed of a pigments-dispersed photoresist.

In accordance with a thirtieth aspect of the present invention, in the twenty-ninth aspect, the pigments-dispersed photoresist which is used for forming the black matrixes is an acrylic pigments-dispersed photoresist.

In accordance with a thirty-first aspect of the present invention, in the twenty-ninth aspect, carbon particles are employed as the pigments for the pigments-dispersed photoresist for the black matrixes.

In accordance with a thirty-second aspect of the present invention, in the twenty-ninth aspect, carbon particles provided with insulation coatings are employed as the pigments for the pigments-dispersed photoresist for the black matrixes.

In accordance with a thirty-third aspect of the present invention, in the twenty-ninth aspect, titanium oxide particles are employed as the pigments for the pigments-dispersed photoresist for the black matrixes.

In accordance with a thirty-fourth aspect of the present invention, in the twenty-ninth aspect, an initialization agent having high sensitivity for the "g", "h" and "i" lines is added to the pigments-dispersed photoresist for the black matrixes.

In accordance with a thirty-fifth aspect of the present invention, in the black matrix formation step of the fourteenth aspect, the black matrixes are formed so as to be connected to each other across pixels which are arranged in a particular direction.

In accordance with a thirty-sixth aspect of the present invention, in the fourteenth aspect, the manufacturing method further comprises an HMDS (HexaMethylDiSilane) exposure step in which the substrate is exposed to an HMDS gas atmosphere before the color filter formation step.

In accordance with a thirty-seventh aspect of the present invention, in the fourteenth aspect, the manufacturing method further comprises an HMDS (HexaMethylDiSilane) exposure step in which the substrate is exposed to an HMDS gas atmosphere before the black matrix formation step.

In accordance with a thirty-eighth aspect of the present invention, in the overcoat layer formation step of the fourteenth aspect, the overcoat layer is formed of a transparent photoresist.

In accordance with a thirty-ninth aspect of the present invention, in the thirty-eighth aspect, the transparent photoresist is a transparent acrylic photoresist.

In accordance with a fortieth aspect of the present invention, in the fourteenth aspect, the switching element which is formed in the switching element formation step is a TFT (Thin-Film Transistor), and the lead electrode is the drain electrode of the TFT.

BRIEF DESCRIPTION OF THE DRAWINGS

The objects and features of the present invention will become more apparent from the consideration of the following detailed description taken in conjunction with the accompanying drawings, in which:

FIGS. 3A and 3B are cross sectional views of the pads of the TFT of FIGS. 1 and 2, in which FIG. 3A shows a gate pad section and FIG. 3B shows a data pad section;

FIGS. 4A through 12H are cross sectional views showing a conventional manufacturing method of an active matrix substrate of FIGS. 1 through 3B;

FIG. 7 is a circuit diagram for explaining the composition of a liquid crystal display device;

FIG. 9 is a cross sectional view of the pixel layout of FIGS. 8A and 8B taken along the line A–A' shown in FIG. 8A;

FIG. 10 is a schematic plan view showing another example of the pixel layout of the liquid crystal display device of FIG. 7;

FIG. 11 is a cross sectional view of the pixel layout of FIG. 10;

FIGS. 12A through 12H are cross sectional views showing a manufacturing method of the liquid crystal display device of FIG. 9 according to the first embodiment of the present invention;

FIGS. 13A through 13C are cross sectional views showing the latter half of a manufacturing method of the liquid crystal display device of FIG. 9 according to the second embodiment of the present invention.

DESCRIPTION OF THE PREFERRED EMBODIMENTS

Figure 2:
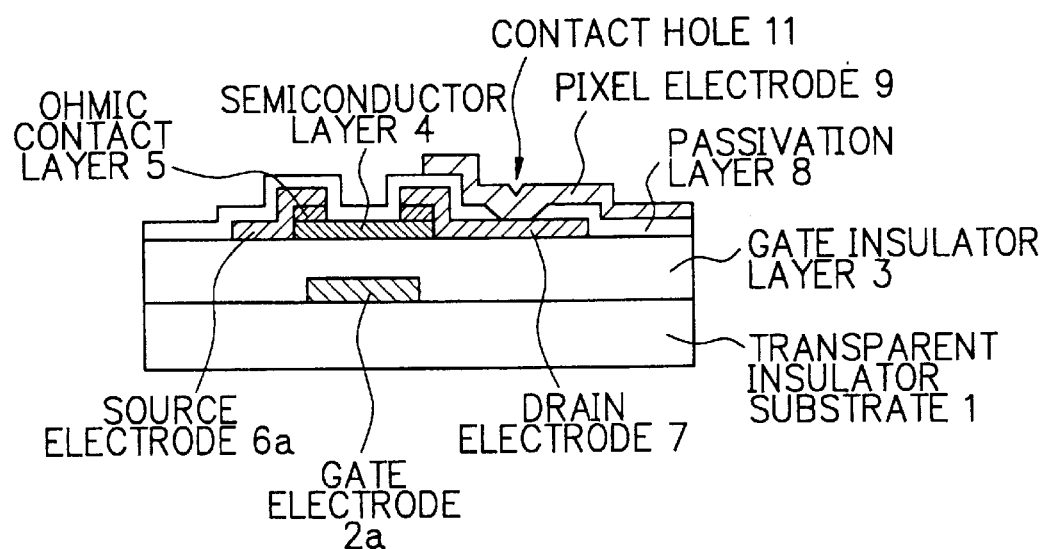
FIG. 2 is a cross sectional view of the TFT of FIG. 1.
Figure 4A:
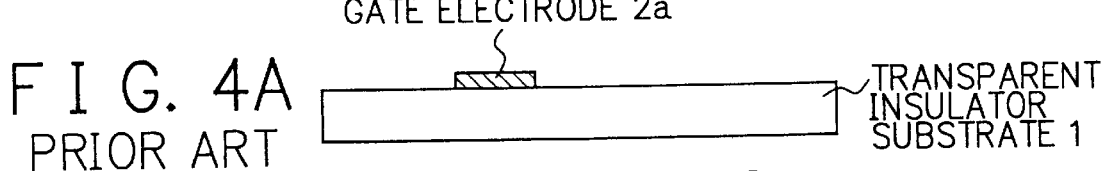
Figure 4B:
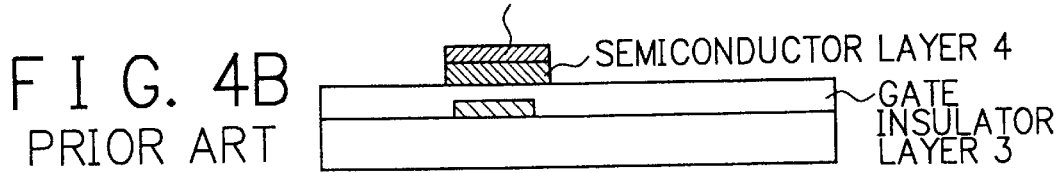
Figure 4C:
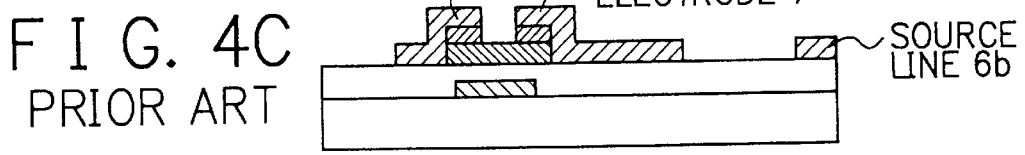
Figure 4D:
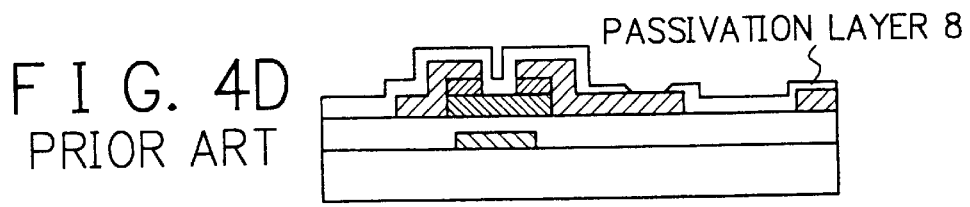
Figure 4E:
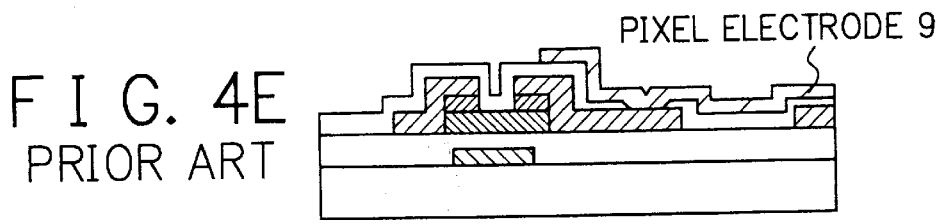
Figure 5A:
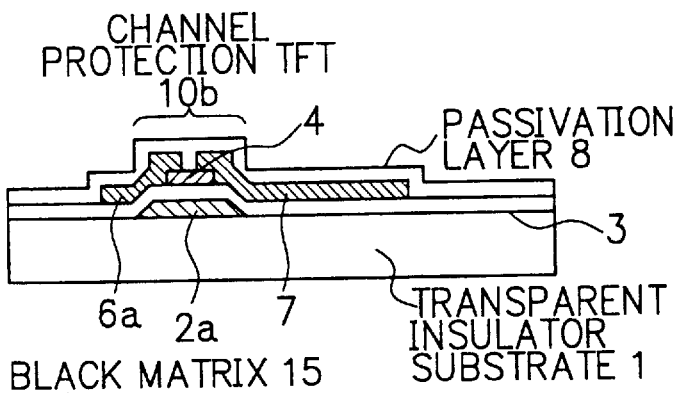
FIGS. 5A through 5H are cross sectional views showing a conventional manufacturing method of a liquid crystal display device of CF on TFT structure.
Figure 5B:
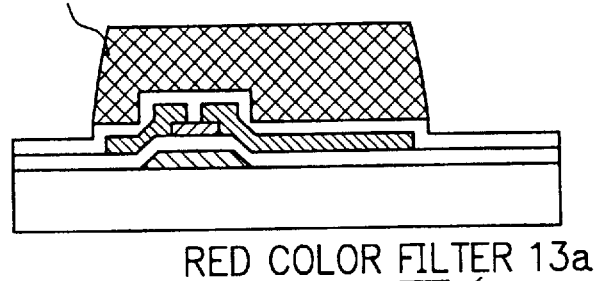
Figure 5C:
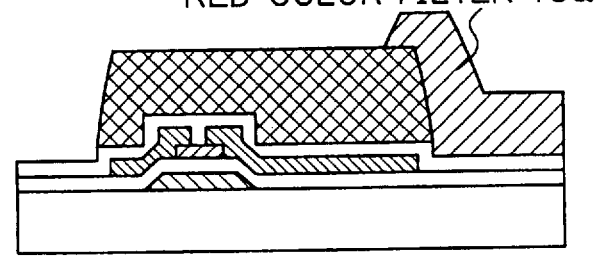
Figures 1, 5D:
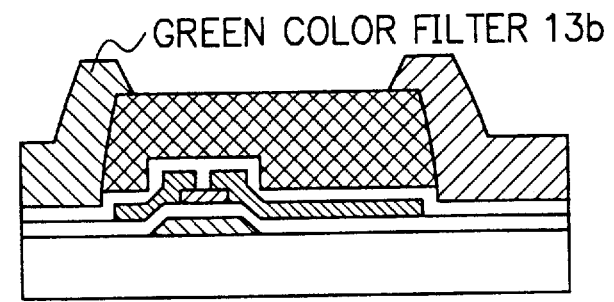
FIG. 1 is a schematic plan view showing a channel-etched type TFT which is formed on an active matrix substrate of a conventional liquid crystal display device.
Figures 2, 5D:
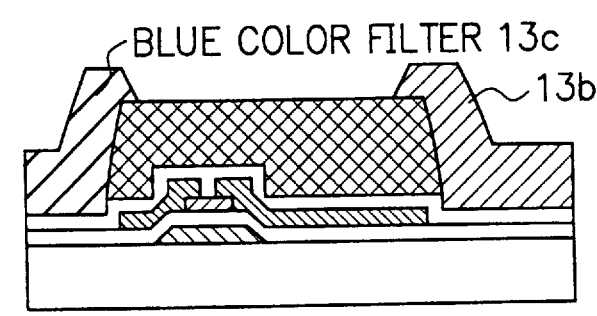
Figure 5E:
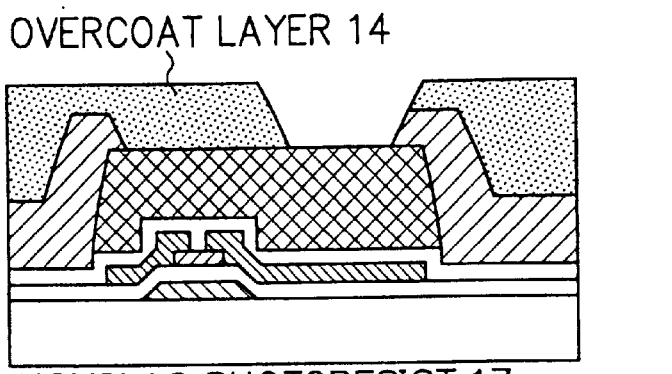
Figure 5F:
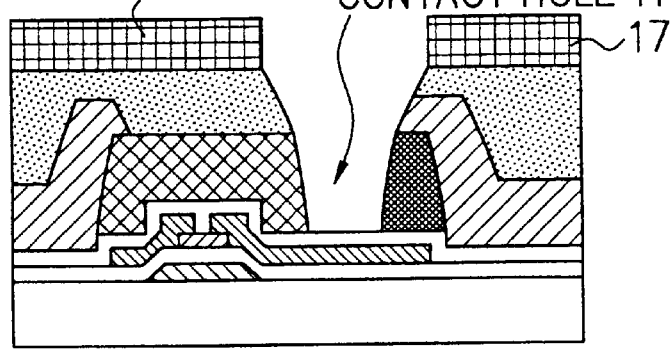
Figure 5G:
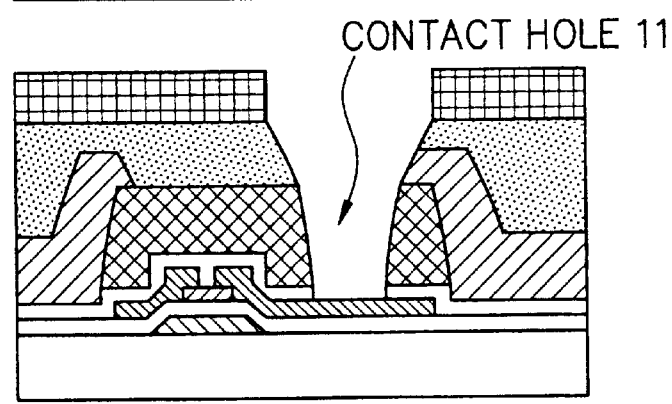
Figure 5H:
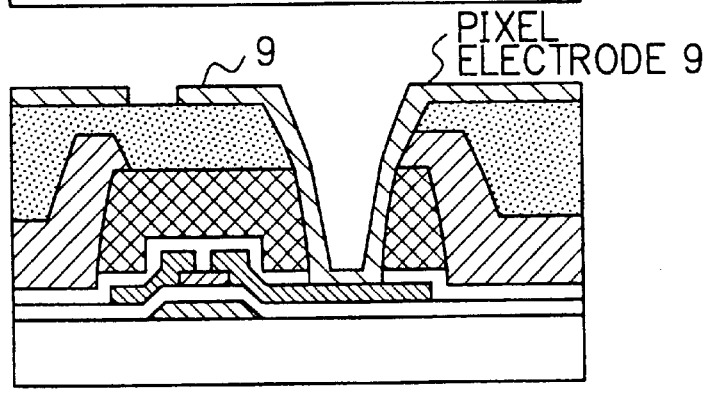
Figure 6A:
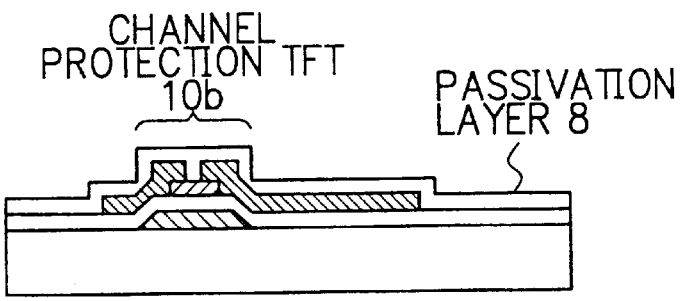
FIGS. 6A through 6G are cross sectional views showing another conventional manufacturing method of a liquid crystal display device of CF on TFT structure.
Figure 6B:
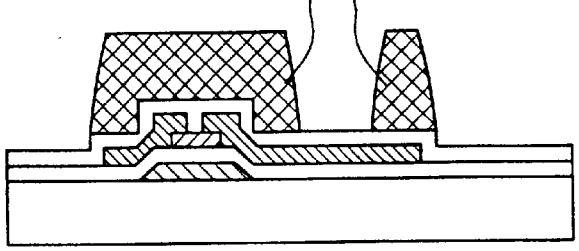
Figure 6C:
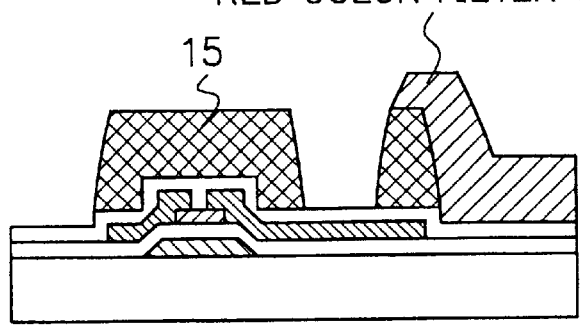
Figure 6D:
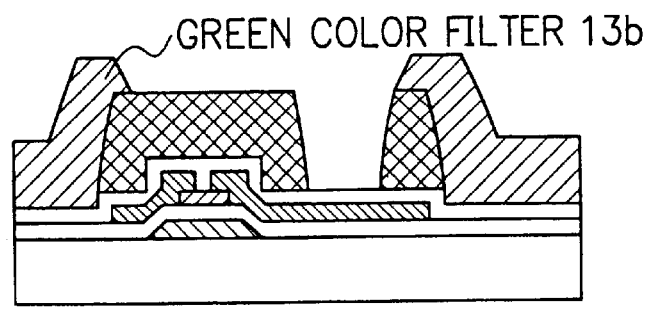
Figure 6E:
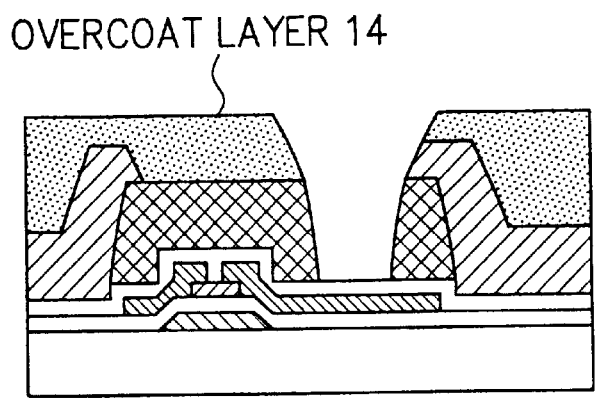
Figure 6F:
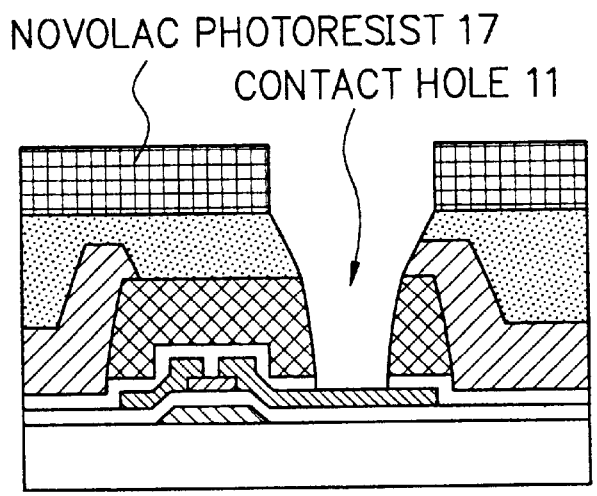
Figure 6G:
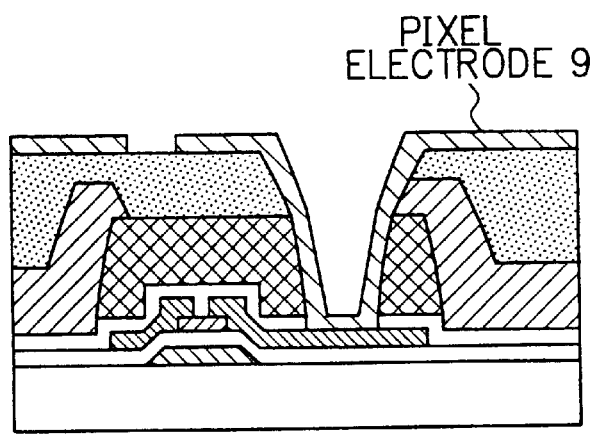

Referring now to the drawings, a description will be given in detail of preferred embodiments in accordance with the present invention.

Figure 7:
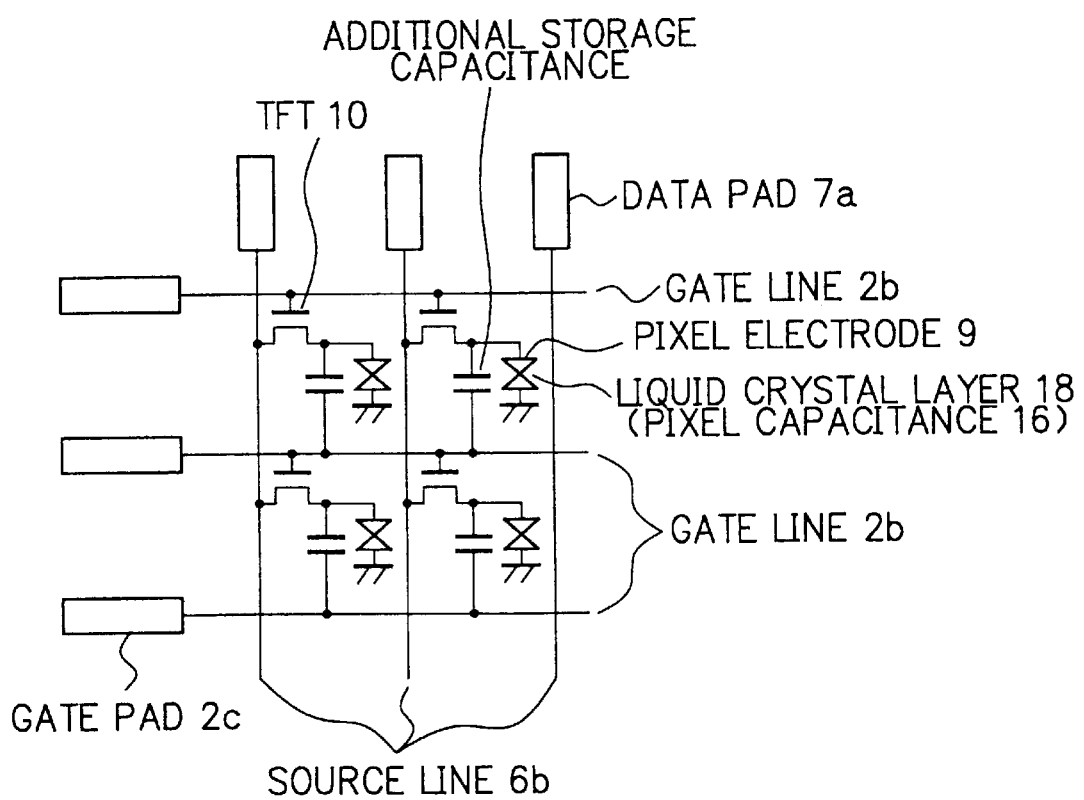

FIG. 7 is a circuit diagram for explaining the composition of a liquid crystal display device. Incidentally, the following explanation will be given assuming that TFTs (Thin-Film Transistors) are employed as the switching elements of the liquid crystal display device, for example. On a transparent insulator substrate, gate lines 2b and source lines 6b are formed so as to intercross at right angles. Each TFT 10 is formed corresponding to each intersection of the signal lines (the gate line 2b and the source line 6b). The gate line 2b is connected to the gate electrode of the TFT 10, and the TFT 10 corresponding to a pixel is driven by a scanning signal which is supplied to its gate electrode via the gate line 2b. The source line 6b is connected to the source electrode of the TFT 10, and a video signal is supplied to the source electrode via the source line 6b. The drain electrode of the TFT 10 is connected to a corresponding pixel electrode 9. A pixel capacitance 16 is formed by a liquid crystal layer 18 which is sandwiched between the pixel electrode 9 and a common electrode on the opposite substrate. In the example of FIG. 7, the pixel electrode 9 overlays on the adjacent gate line 2b (as shown in FIG. 8A) via a gate insulator layer, and thereby the pixel electrode 9 also forms an additional storage capacitance.

Figure 8A:
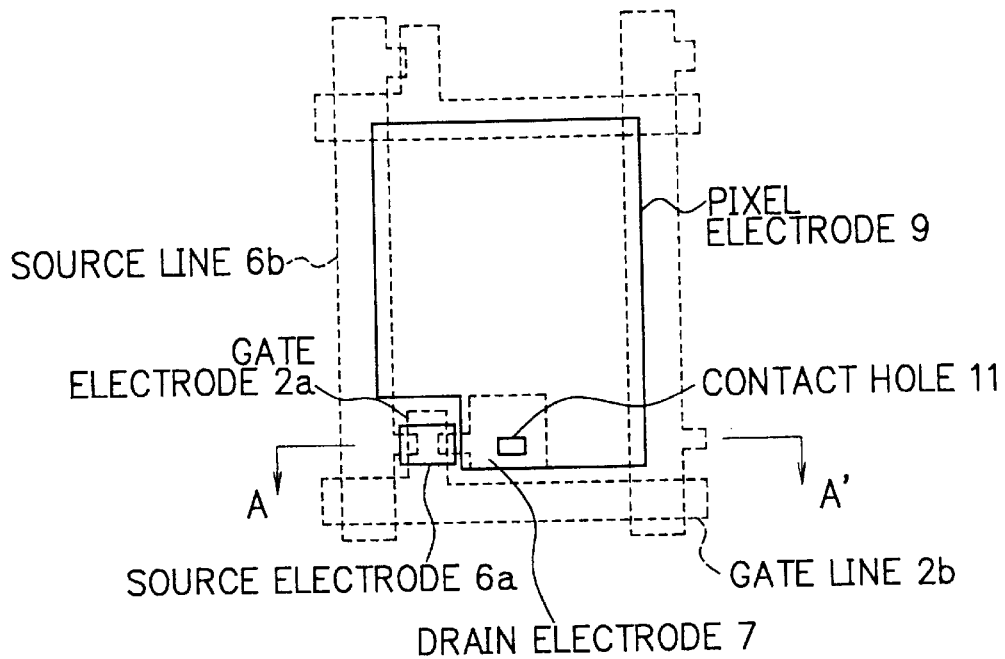
FIGS. 8A and 8B are schematic plan views showing the layout of a pixel of the liquid crystal display device of FIG. 7.
Figure 8B:
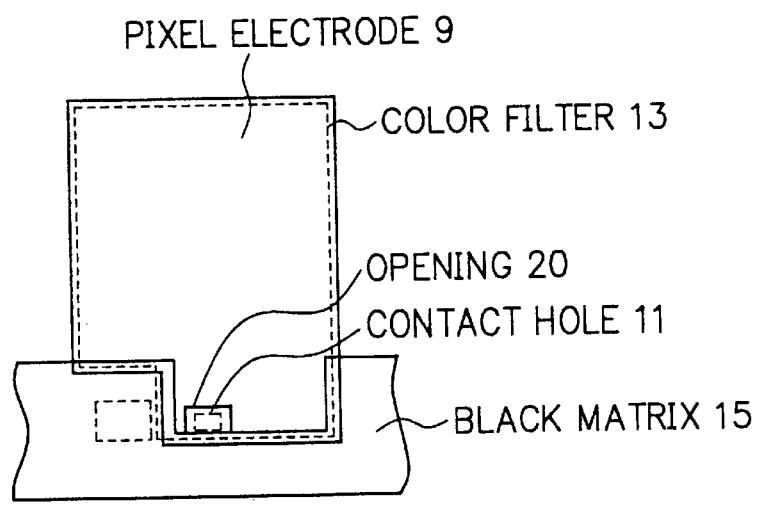

FIGS. 8A and 8B are schematic plan views showing the layout of a pixel of the liquid crystal display device of FIG. 7. For the sake of easy seeing and understanding, parts of the pixel are divided into two figures, in which FIG. 8A shows the relationship between electrodes, lines. etc., and FIG. 8B shows the relationship between the pixel electrode 9, a color filter 13 and the black matrix 15. Beneath each pixel electrode 9, a corresponding color filter 13 is formed. Although not shown in FIGS. 8A and 8B, an overcoat layer 14 is formed between the color filters 13 and the pixel electrodes 9. A passivation layer 8 (unshown in FIGS. 8A and 8B) is formed on the gate lines 2b, and black matrixes 15 are formed on the passivation layer 8 so as to cover the gate lines 2b. The black matrixes 15 are provided in order to prevent the light leakage. The black matrixes 15 also shield the TFTs from light in order to protect the TFTs. Incidentally, in the liquid crystal display device shown in FIG. 8A, the pixel electrode 9 is formed to overlay on the source lines 6b so as to prevent the light leakage between the pixel electrode 9 and the source line 6b. In such cases, the black matrixes 15 do not need to cover the source line 6b, and thus the black matrixes 15 are formed so as to cover the gate lines 2b. A contact hole 11 is formed through an opening of the passivation layer 8 and the overcoat layer 14, for connecting the drain electrode 7 of the TFT and the pixel electrode 9. The black matrix 15 is not formed around the contact hole 11. Under the black matrixes 15 and the color filters 13, the gate lines 2b and the source lines 6b are formed so as to intercross at right angles. At each intersection of a gate line 2b and a source line 6b, a TFT (a source electrode 6a, a gate electrode 2a and a drain electrode 7) is formed. The gate line 2b and the source line 6b are connected to the gate electrode 2a and the source electrode 6a of the TFT, respectively. A corresponding pixel electrode 9 is connected to the drain electrode 7 of the TFT via the contact hole 11 through the overcoat layer 14 and the passivation layer 8. A scanning signal is supplied to the gate electrode 2a via the gate line 2b, and a video signal is supplied to the source electrode 6a via the source line 6b, and thereby electric charges are written in the pixel electrode 9.

Figure 9:
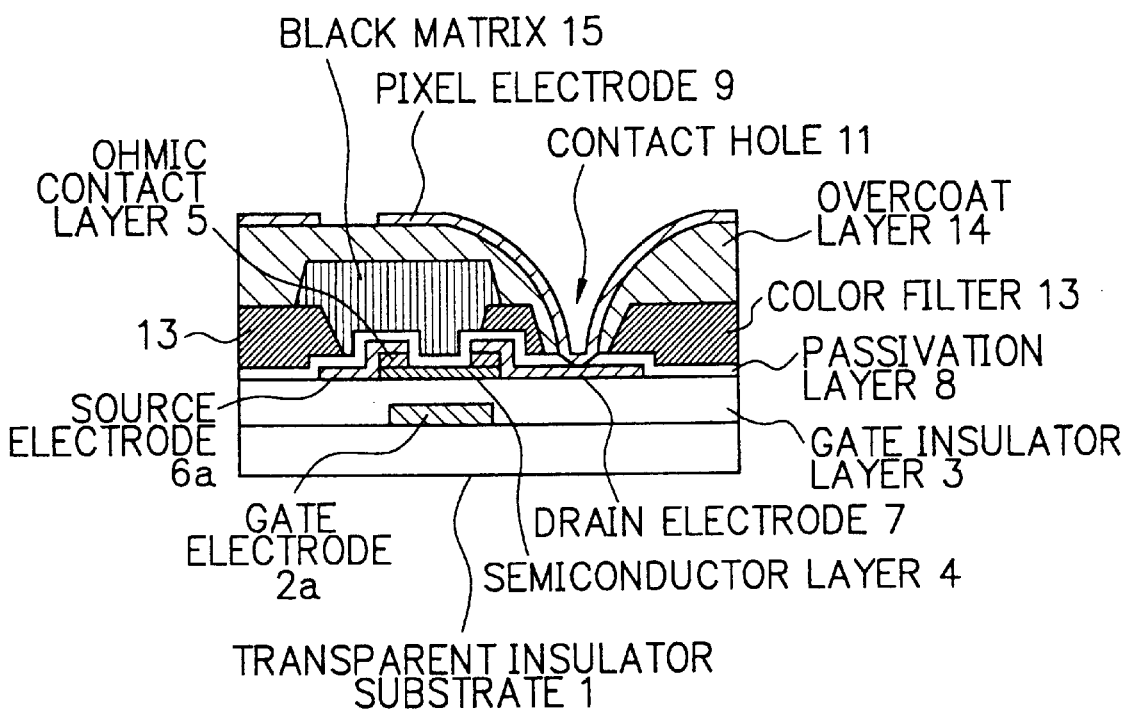

FIG. 9 is a cross sectional view of the pixel layout of FIGS. 8A and 8B taken along the line A–A' shown in FIG. 8A. FIG. 9 represents the characteristics of the present invention best. A gate electrode 2a is formed on a transparent insulator substrate 1, and a gate insulator layer 3 is deposited so as to cover the transparent insulator substrate 1 and the gate electrode 2a. On the gate insulator layer 3, a semiconductor layer 4 is formed so as to overlay on the gate electrode 2a. A source electrode 6a and a drain electrode 7, which are formed on different sides of the semiconductor layer 4, are respectively connected to the semiconductor layer 4 via an ohmic contact layer 5. Part of the deposited ohmic contact layer between the source electrode 6a and the drain electrode 7 is removed by etching, and thus the ohmic contact layer 5 remains only between the source electrode 6a and the semiconductor layer 4 and between the drain electrode 7 and the semiconductor layer 4. On the above structure (including the part where the ohmic contact layer has been removed), a passivation layer 8 is formed. Such a TFT is generally called a "channel-etched TFT".

When the TFT is used as a switching element of a pixel of a liquid crystal display device, the drain electrode 7 operates also as a lead electrode to a corresponding pixel electrode 9. The drain electrode 7 is connected to the pixel electrode 9 via the contact hole 11 through the passivation layer 8 and the overcoat layer 14.

On the passivation layer 8, color filters 13 (R, G and B) are formed corresponding to pixel display areas of the liquid crystal display device. The color filters 13 are not formed around the contact holes 11. Therefore, the color filter layer (composed of the color filters 13) has openings corresponding to the areas around the contact holes 11.

Figure 10:
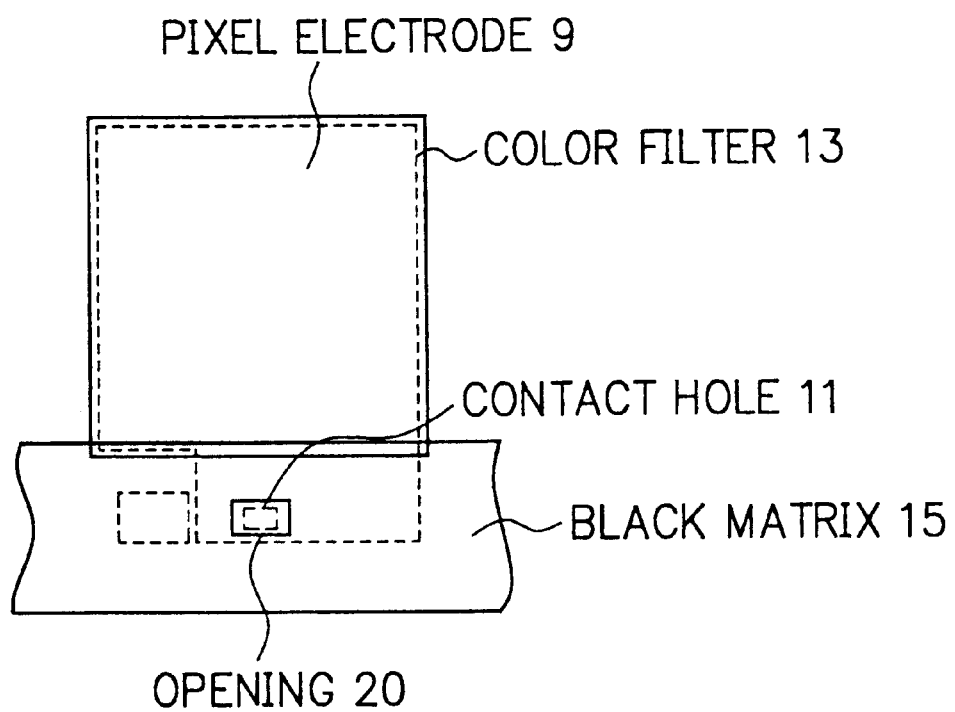
Figure 11:
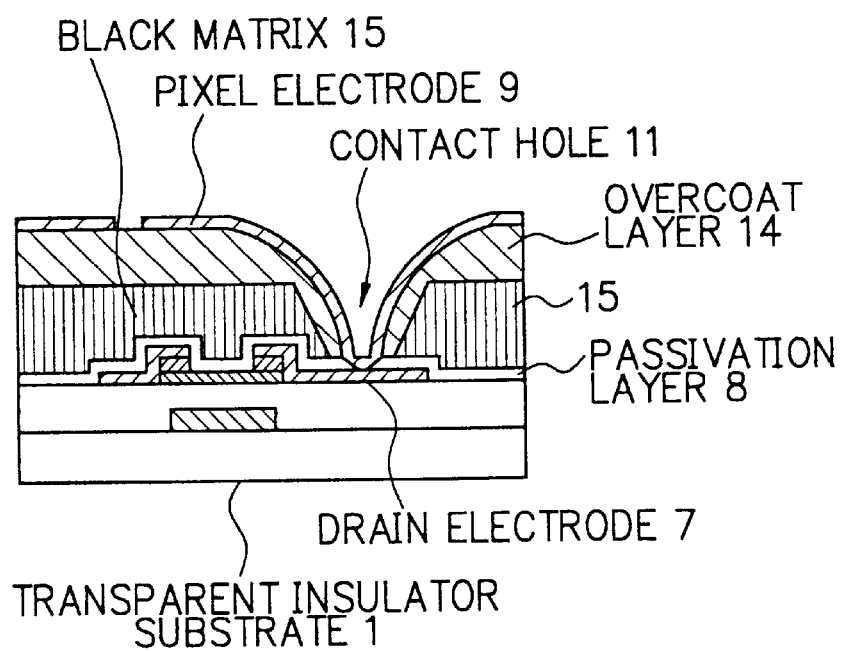

Incidentally, while the openings are made in the color filter layer in the example of FIGS. 8A through 9, it is also possible to make openings in the black matrixes 15 as shown in FIG. 10 (plan view) and FIG. 11 (cross sectional view). In the example of FIGS. 10 and 11, the color filter 13 is placed behind the opening (the area around the contact hole 11) in FIG. 11, and thus the color filter 13 is not shown in FIG. 11. It is also possible to place the opening between the color filter 13 and the black matrix 15 in a cross sectional view similar to FIG. 9.

In the example of FIG. 8A, the black matrixes 15 are formed on the passivation layer 8 as a shade so as to cover the gate lines 2b and the TFTs, for preventing the light leakage and for protecting the TFTs from light. However, the black matrix pattern is determined based on the relationship between the pixel electrode 9 and the source lines 6b and the relationship between the pixel electrode 9 and the gate lines 2b, so as to prevent the light leakage. The black matrixes 15 are formed so as to over the TFTs at least. It is also possible to form the black matrixes 15 so as to cover all the gaps between the color filters 13. However, in every case, the openings, where no color filter 13 nor black matrix 15 is formed, re necessarily provided around the contact holes 11.

In the liquid crystal display device of the present invention, where the color filter 13 and the black matrix 15 touch each other, the black matrix 15 is formed to cover the edge of the color filter 13 (that is, the edge of the black matrix 15 is superposed on the edge of the color filter 13) as shown in FIG. 9. The relationship between the color filter 13 and the black matrix 15 also holds in the example of FIG. 11 although not shown.

By overlaying the edge of the black matrix 15 on the edge of the color filter 13, the side wall of the black matrix 15 (at least part near the passivation layer 8) is protected by the color filter 13 and is not exposed to the developing solution in the development process, thereby the pattern flake-off of the black matrixes 15 (which has been mentioned as a problem of the prior art) can be reduced.

It is desirable that the black matrixes 15 are formed so as to be connected to each other across pixels arranged in the horizontal direction (i.e. the direction of the gate line 2b). By such formation, the pattern flake-off of the black matrixes 15 can be reduced further.

The structure mentioned above is implemented by forming the black matrixes 15 after the formation of the color filters 13. In the manufacturing method according to the present invention, the black matrixes 15 are formed after the formation of the color filters 13, and in the formation of the color filters 13 and the black matrixes 15, the areas around the contact holes 11 are reserved as the openings for the contact holes 11.

By forming the black matrixes 15 after forming the color filters 13, no residue of the color filter photoresists remains in the contact hole openings as will be mentioned below. Therefore, an opening for the contact hole 11 to reach the drain electrode 7 through the passivation layer 8 can be formed by etching the passivation layer 8 easily and reliably.

According to study by the present inventors, in the conventional manufacturing method in which the black matrixes 15 are formed and thereafter the color filters 13 are formed, a dim residue of the black matrix photoresist (carbon pigments etc.) tends to remain on the part of the passivation layer 8 where the black matrix photoresist has been removed by patterning after coating. Or the characteristics of the surface of the passivation layer 8 (hydrophilic/hydrophobic etc.) change due to the formation of the black matrixes 15, and thereby residues of the color filter photoresists tend to remain by cohesion etc. on parts of the surface of the passivation layer 8 where the color filter photoresists have been removed by patterning. On the other hand, in the manufacturing method according to the present invention, the color filters 13 are formed before the formation of the black matrixes 15. According to experiments conducted by the present inventors, it became clear that no residues of the color filters 13 remain in the contact hole openings around which no color filter 13 nor black matrix 15 is formed.

The residue problem described above occurs commonly when pigments-dispersed photoresists are used for the color filters 13 and the black matrixes 15. Therefore, the present invention is especially effective for cases where the color filters 13 and the black matrixes 15 are formed of pigments-dispersed photoresists. The present invention is the most effective in the case where acrylic pigments-dispersed photoresists (which are widely used as materials of color filters) are employed.

Pigments can be selected arbitrarily depending on colors. As the pigments for the black matrix photoresist, carbon, titanium oxide, black organic pigments (or several types of color organic pigments mixed to be black), etc. Carbon particles having insulation coatings are most preferably employed in the present invention as the pigments for the lack matrixes photoresist. For the color filters 13 (R, G and B), generally used organic pigments etc. can be selected and used.

The present invention can be effectively applied to liquid crystal display devices as long as the connection between the pixel electrode 9 and the switching element (TFT 10 etc.) is established through the color filter layer or the black matrix layer. The switching element is not particularly limited to a TFT, and an MIM (Metal-Insulator-Metal) diode, etc. can also be employed as the switching element. While the TFT shown in the figures is of inverse-staggered type in which the gate electrode is placed lower than the source electrode and the drain electrode, a TFT of staggered type can also be employed in the liquid crystal display device according to the present invention.

The other composition than those which have been described above (materials for the liquid crystal, an alignment layer, the opposite substrate, the common electrode, etc.) are not particularly restricted, and can be designed according to general design of liquid crystal display devices. The color filters 13 are generally composed of red color filters 13a, green color filters 13b and blue color filters 13c, however, the filter composition can be varied if necessary.

In the following, a manufacturing method of a liquid crystal display device according to a first embodiment of the present invention will be described in detail referring to FIGS. 12A through 12H. FIGS. 12A through 12H are cross sectional views showing a manufacturing method of the liquid crystal display device shown in FIG. 9, according to the first embodiment of the present invention. Incidentally, the following explanation will be given mainly with regard to one pixel.

Figure 12A:
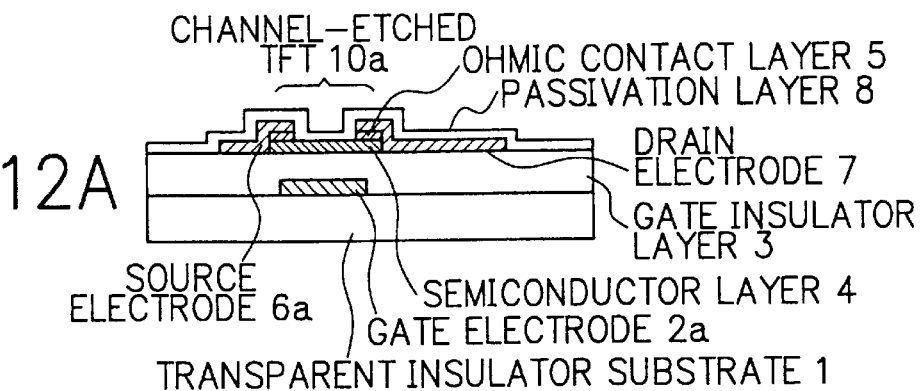

First, as shown in FIG. 12A, a channel-etched TFT 10a is formed on a transparent insulator substrate 1 such as a glass substrate. The channel-etched TFT 10a can be formed similarly to the conventional manufacturing method, as follows:

A conductive layer of Al, Mo, Cr, etc. is sputtered on the transparent insulator substrate 1 to the thickness of 100~400 nm, and thereafter the gate line 2b (unshown in FIG. 12A, shown in FIG. 8A), the gate electrode 2a and the gate pad 2c (unshown in FIG. 12A, shown in 7) (which is connected to an external display signal processor board) are formed by photo-lithography.

Subsequently, the gate insulator layer 3 (formed of silicon nitride), the semiconductor layer 4 (formed of amorphous silicon) and the ohmic contact layer 5 (formed of $n^{30}$ amorphous silicon) are successively deposited by means of plasma CVD (Chemical Vapor Deposition) to the thicknesses of approximately 400 nm, 300 nm and 50 nm respectively, and thereafter the semiconductor layer 4 and the ohmic contact layer 5 are patterned at once.

Subsequently, a layer of Mo, Cr, etc. is sputtered to the thickness of 100~200 nm so as to cover the gate insulator layer 3 and the ohmic contact layer 5, and thereafter the source electrode 6a, the source line 6b (unshown in FIG. 12A, shown in FIG. 8A), the drain electrode 7 and the data pad 7a (unshown in FIG. 12A, shown in FIG. 7) (which is connected to the external display signal processor board) are formed by photo-lithography. Thereafter, unnecessary part of the ohmic contact layer 5 on the channel of the TFT is removed.

Subsequently, the passivation layer 8 (formed of an inorganic material such as silicon nitride) is deposited on the back channel of the TFT, the source electrode 6a, the source line 6b (unshown in FIG. 12A, shown in FIG. 8A), the drain electrode 7 and the data pad 7a (unshown in FIG. 12A, shown in FIG. 7) by means of plasma CVD to the thickness of approximately 100~200 nm, thereby the channel-etched TFT 10a shown in FIG. 12A has been formed.

Figure 12B:
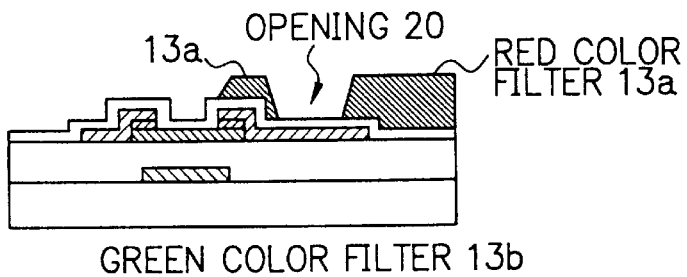

Subsequently, as shown in FIG. 12B, a negative pigments-dispersed red color photoresist (acrylic resin in which red pigments have been dispersed) is coated on the substrate by spin coating. The number of revolutions of the spin coater is controlled so that the thickness of the red color photoresist will become approximately 1.2 μm. Subsequently, the substrate is prebaked (80° C., 2 min), exposed, and developed by a TMAH (TetraMethylAmmonium Hydro-oxide) solution, and thereby the red color filter 13a is patterned into a predetermined pattern. In the patterning of the red color filter 13a, the opening 20 (where the red color filter 13a is not formed) is provided so that the contact hole 11 for connecting the drain electrode 7 and the pixel electrode 9 can be formed later. The diameter of the opening 20 is set large enough so that the contact hole 11 can be formed therein. Subsequently, the substrate is baked (220° C., 60 min) in a clean oven and thereby the red color filter 13a is hardened.

After the red color filters 13a have been formed on the substrate, a step for removing and cleaning a residue of the red color photoresist is executed. Concretely, the substrate on which the red color filters 13a have been formed and patterned is radiated with UV rays (of the luminous intensity of approximately 20 mW) for 60 sec, and the residue of the red color photoresist which has been broken down by the UV rays is removed by spin cleaning.

Figure 12C:
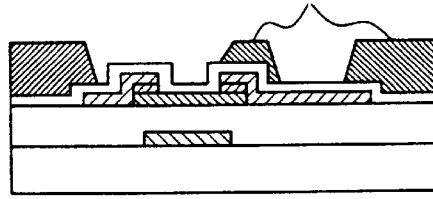

Subsequently, as shown in FIG. 12C (showing another pixel adjacent to FIG. 12B), the green color filter 13b is formed in the same way as the red color filter 13a. After the green color filters 13b have been formed on the substrate, a step for removing and cleaning a residue of the green color photoresist is executed, similarly to the residue-removing step for the red color photoresist.

Figure 12D:
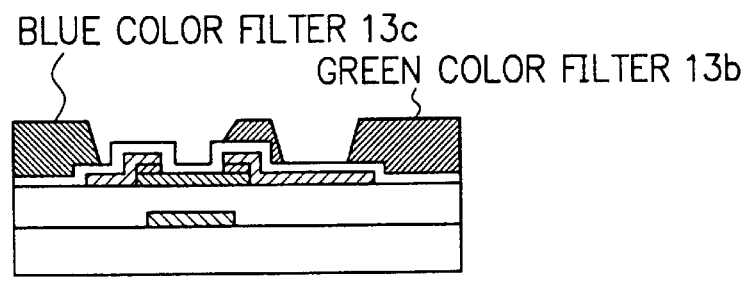

Subsequently, as shown in FIG. 12D (showing another pixel adjacent to FIGS. 12B and 12C), the blue color filter 13c is formed in the same way. After the blue color filters 13c have been formed on the substrate, a step for removing and cleaning a residue of the blue color photoresist is executed, similarly to the residue-removing steps for the red and green color photoresists.

Figure 12E:
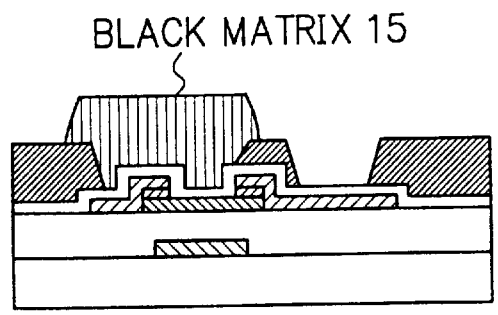

After the formation of the RGB color filters 13a, 13b and 13c, the black matrix 15 is formed as shown in FIG. 12E. For the black matrix 15, a pigments-dispersed black matrix photoresist (acrylic resin in which black pigments such as carbon have been dispersed) is preferably used. In this embodiment, the pigments-dispersed black matrix photoresist of a viscosity of 20 cp is coated on the substrate by spin coating to the thickness of approximately 1.5 μm, and thereafter the black matrix photoresist is patterned to a predetermined pattern of the black matrixes 15 so that no black matrix 15 will be formed on the contact holes 11. The patterning of the black matrixes 15 is executed similarly to the patterning of the color filters 13 (coating of the black matrix photoresist, prebaking, exposure, development and baking.

After the black matrixes 15 have been formed on the substrate, a step for removing and cleaning a residue of the black matrix photoresist is executed, similarly to the residue-removing steps for the red, green and blue color photoresists.

The black matrix photoresist is a negative photoresist which hardly passes light, therefore, radicals are generated on the surface of the black matrix photoresist by enough exposure to light. The radicals disperses inside the black matrix photoresist, thereby the photo-polymerization proceeds also in the depths (i.e. parts far from the surface) of the black matrix photoresist. However, the strength of the photo-polymerization in the depths is weaker than on the surface. Therefore, in the present invention, the tolerance of development is gained by protecting the side walls of the black matrixes 15 by the color filters 13. In order to generate the radicals efficiently, an initialization agent having high sensitivity for the "g", "h" and "i" lines is preferably selected and added to the black matrix photoresist. It is also effective to execute the exposure of the black matrix photoresist to light in a nitrogen gas atmosphere, so as to prevent the radicals from being quenched by ozone which is generated by decomposition of oxygen gas in the exposure. In order to let the radicals disperse effectively in the depths of the black matrix 15, so called "PEB (Post Exposure Bake) process can be executed. So called HMDS (HexaMethylDiSilane) process (exposing the substrate in an HMDS gas atmosphere before the coating of the black matrix photoresist) can also be employed for improving the adhesion of the black matrixes 15 to the foundations.

Figure 12F:
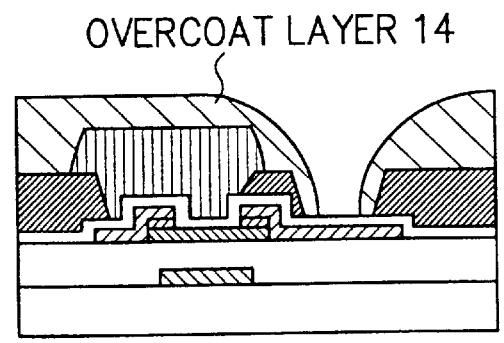

Subsequently, as shown in FIG. 12F, a transparent acrylic photoresist (for becoming the overcoat layer 14) is coated on the substrate so as to flatten the surface of the substrate, and the transparent acrylic photoresist layer is patterned by exposure and development so as to have openings for the contact holes 11. The patterned transparent acrylic photoresist layer is hardened by baking (220° C., 60 min), and thereby the overcoat layer 14 is formed.

Figure 12G:
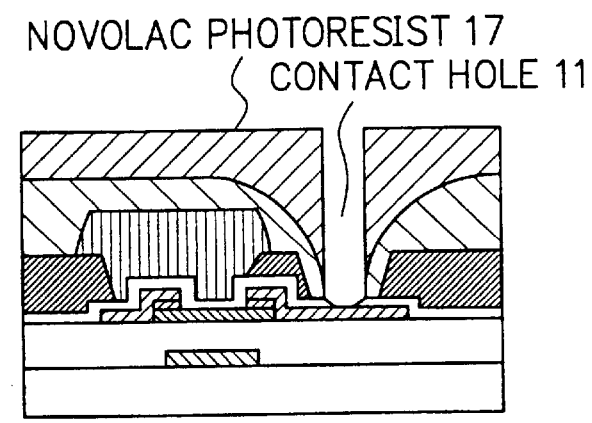

Subsequently, as shown in FIG. 12G, a novolac photoresist 17, for example, is coated and patterned on the overcoat layer 14, and thereafter part of the passivation layer 8 is etched using the novolac photoresist 17 as a mask, thereby openings for the contact holes 11 are formed through the passivation layer 8.

Incidentally, while the opening for the contact hole 11 was formed in the above explanation in two steps (formation of an opening through the overcoat layer 14 and formation of an opening through the passivation layer 8), it is also possible to form the contact hole opening by etching the overcoat layer 14 and the passivation layer 8 at once, that is, without the patterning of the overcoat layer 14.

In the manufacturing method of the present invention, the black matrixes 15 are formed after the formation of the color filters 13. Therefore, the residues of the color filter photoresists and the black matrix photoresist do not occur in the contact hole 11 at all, and thus no problem occurs in the subsequent etching of the passivation layer 8. Further, the openings for the contact holes 11 are formed just before the sputtering of the transparent conductive layer for becoming the pixel electrodes 9 (that is, no other process is executed between the formation of the contact hole openings and the sputtering of the transparent conductive layer for the pixel electrodes 9), therefore, the openings for the contact holes 11 are not oxidized nor contaminated by process. Therefore, the resistance of the connection between the drain electrode 7 and the pixel electrode 9 is reduced, and thereby a satisfactory active matrix substrate can be obtained.

In this step, unnecessary parts of the passivation layer 8 on the data pads 7a (unshown in FIG. 12G, shown in FIG. 7) and unnecessary parts of the gate insulator layer 3 on the gate pads 2c are also removed at the same time.

Figure 12H:
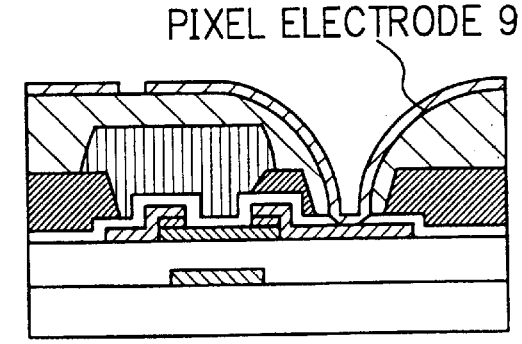

Subsequently, as shown in FIG. 12H, after removing the novolac photoresist 17, a transparent conductive layer of ITO (Indium-Tin-Oxide) etc. for becoming the pixel electrodes 9 is sputtered on the overcoat layer 14 and on the parts of the drain electrodes 7 exposed in the contact holes 11. The transparent conductive layer is thereafter patterned to a predetermined pattern, thereby the pixel electrodes 9 are formed. In the formation of the pixel electrode 9, as the transparent conductive layer is deposited thicker, the coverage of the transparent conductive layer in the contact hole 11 becomes better and thereby electrical connection of the pixel electrode 9 to the drain electrode 7 becomes more stable. However, in consideration of process efficiency of the ITO which is used for the transparent conductive layer, an appropriate thickness of the pixel electrode 9 is 100 nm or so.

Thereafter, the substrate is coupled with the opposite substrate and liquid crystal is poured and packed between the substrates according to an ordinary manufacturing method, thereby the liquid crystal display device is completed.

Incidentally, the thicknesses of the color filter 13 and the black matrix 15 are preferably set according to materials which are employed for them. When generally used materials are employed, the thicknesses of the color filter 13 and the black matrix 15 (when coated) are approximately 1.0~1.5 $\mu$m and 1.0~2.0 $\mu$m, respectively. The thickness of the overcoat layer 14 is set to be capable of flattening the surface of the substrate, to approximately 2.5~4.5 $\mu$m when coated.

As described above, in the manufacturing method of a liquid crystal display device of the on-array color filter structure (i.e. the CF (Color Filter) on TFT structure etc.) according to the first embodiment of the present invention, the black matrixes 15 are formed after the formation of the color filters 13, thereby the residues in the opening for the contact hole 11 for connecting the switching element (TFT etc.) and the pixel electrode 9 is eliminated. Therefore, etching of the passivation layer 8 for forming the openings for the contact holes 11 can be executed easily and reliably, and the resistance of the connection between the switching element and the pixel electrode 9 is reduced, and thus a satisfactory active matrix substrate of on-array color filter structure can be obtained.

Further, the black matrixes 15 have not been formed at the points when the residue-removing steps for the red, green and blue color photoresists using UV rays are executed. Therefore, the deterioration of the resistance of the black matrix 15 due to excessive radiation of the UV rays is avoided, and thereby the signal delay is eliminated.

Furthermore, the edges of the black matrixes 15 are superposed on the edges of the color filters 13, thereby the flake-off of the side walls of the black matrixes 15 is avoided in the development process.

In the following, a manufacturing method of a liquid crystal display device according to a second embodiment of the present invention will be described in detail referring to FIGS. 12A through 12D and 13A through 13C. FIGS. 13A through 13C are cross sectional views showing the latter half of a manufacturing method of the liquid crystal display device shown in FIG. 9, according to the second embodiment of the present invention. The first half of the manufacturing method is executed in the same way as the first embodiment as shown in FIGS. 12A through 12D.

First, as explained in the first embodiment referring to FIGS. 12A through 12D, the RGB color filters 13 (13a, 13b and 13c) are formed on the transparent insulator substrate 1 on which the TFTs have been completed. Incidentally, after each completion of a color filter (13a, 13b, 13c), a step for removing and cleaning a residue of the color photoresist is executed, as mentioned in the first embodiment.

Subsequently, as shown in FIG. 13A, the black matrixes 15 are formed in the same way as the first embodiment.

After the black matrixes 15 have been formed on the substrate, a step for removing and cleaning a residue of the black matrix photoresist is executed, as mentioned in the first embodiment.

Subsequently, as shown in FIG. 13B (in the same way as the first embodiment), a transparent acrylic photoresist (for becoming the overcoat layer 14) is coated on the TFT substrate (on which the color filters 13a, 13b and 13c and the black matrixes 15 have been formed) so as to flatten the surface of the substrate, and the transparent acrylic photoresist layer is patterned by exposure and development so as to have openings for the contact holes 11. The patterned transparent acrylic photoresist layer is hardened by baking (220° C., 60 min), and thereby the overcoat layer 14 is formed.

Subsequently, parts of the passivation layer 8 (corresponding to the openings for the contact holes 11) are etched using the patterned and hardened overcoat layer 14 (not the novolac photoresist 17 of the first embodiment) as a mask, thereby openings for the contact holes 11 are formed through the passivation layer 8. The etching of the passivation layer 8 can be conducted without using a photoresist as in the first embodiment, by selecting an etching condition by which the acrylic overcoat layer 14 is not etched. For example, the PE (Plasma Etching) method using $SF_6$, He and $O_2$ as etching gasses can be employed. Concrete examples of the etching conditions of the second embodiment are as follows: SF$_6$ flow: 60 sccm, He flow: 40 sccm, O$_2$ flow: 150 sccm, pressure: 40 Pa, power: 1200 W, gap (between the plasma electrode and the substrate): 50 mm, etching time: 120 sec.

Subsequently, as shown in FIG. 13C, a transparent conductive layer for becoming the pixel electrodes 9 is sputtered on the overcoat layer 14 and on the parts of the drain electrodes 7 exposed in the contact holes 11. The transparent conductive layer is thereafter patterned to a predetermined pattern, thereby the pixel electrodes 9 are formed.

Thereafter, the substrate is coupled with the opposite substrate and liquid crystal is poured and packed between the substrates according to an ordinary manufacturing method, thereby the liquid crystal display device is completed.

As described above, in the manufacturing method of a liquid crystal display device of the on-array color filter structure (i.e. the CF on TFT structure etc.) according to the second embodiment of the present invention, the etching of the passivation layer 8 for forming the openings for the contact holes 11 is conducted by dry etching using the patterned overcoat layer 14 as a mask (without using the novolac photoresist 17). Therefore, one photo-lithography step can be omitted in comparison with the first embodiment, thereby the manufacturing process can be shortened.

In the following, a manufacturing method of a liquid crystal display device according to a third embodiment of the present invention will be described in detail referring to FIGS. 12A through 12D and 14A through 14E. FIGS. 14A through 14E are cross sectional views showing a black matrix formation process of a manufacturing method of a liquid crystal display device according to the third embodiment of the present invention.

The first half of the manufacturing method is executed in the same way as the first and second embodiments as shown in FIGS. 12A through 12D, and thereby the RGB color filters 13 (13a, 13b and 13c) are formed on the transparent insulator substrate 1 on which the TFTs have been completed.

Figure 14A:
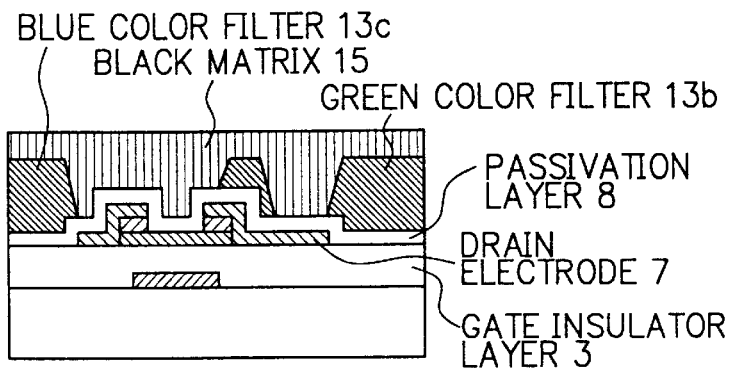
FIGS. 14A through 14E are cross sectional views showing a black matrix formation process of a manufacturing method of a liquid crystal display device according to the third embodiment of the present invention.

In the third embodiment, the subsequent black matrix formation process is executed as follows:

First, as shown in FIG. 14A, a negative black matrix photoresist (for becoming the black matrixes 15) is coated on the substrate, and the substrate is prebaked (90° C., 2 min).

Figure 14B:
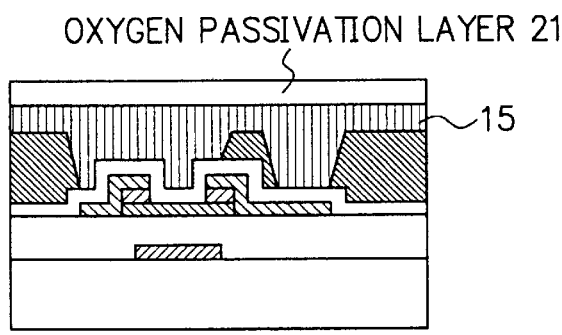

Subsequently, as shown in FIG. 14B, an oxygen passivation layer 21 is coated on the substrate in order to prevent the radicals (which are generated on the surface of the black matrix photoresist in exposure) from being quenched by ozone (which is generated in the atmosphere during exposure), and thereafter the substrate is prebaked again (90° C., 1 min). As the oxygen passivation layer 21, polyvinyl alcohol resin dissolved in isopropyl alcohol and water is used, for example.

Figure 14C:
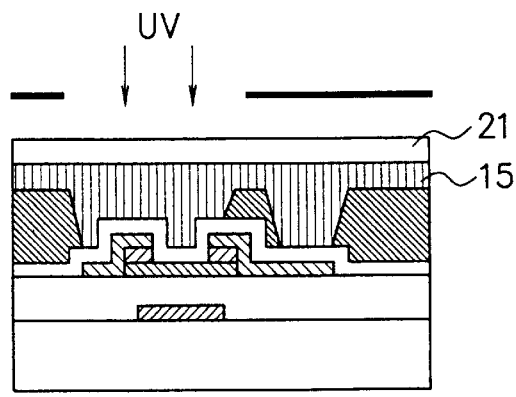

Subsequently, as shown in FIG. 14C, exposure of the black matrix photoresist is executed by radiating the substrate with UV rays of an energy of approximately 50~200 mJ (50 mW×1~4 sec, for example), using a g-h-i line stepper. After the exposure, the PEB (Post Exposure Bake) process (80° C., 2 min) is executed in order to let the generated radicals disperse effectively into the depths of the black matrix photoresist.

Figure 14D:
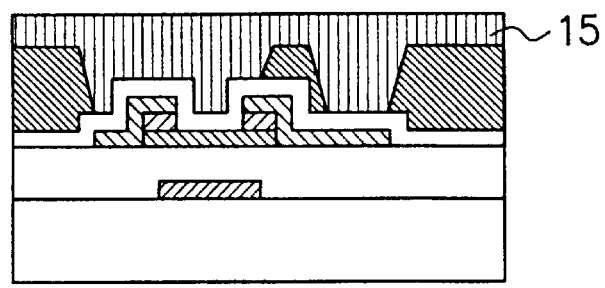

Subsequently, as shown in FIG. 14D, the substrate is rinsed for 1 minute and thereby the oxygen passivation layer 21 on the surfaces of the black matrix photoresist is removed.

Figure 14E:
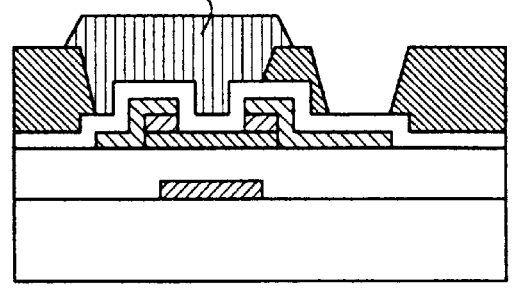

Finally, as shown in FIG. 14E, development of the black matrixes 15 is executed using a TMAH (TetraMethylAmmonium Hydro-oxide) solution as developer, and the developed black matrixes 15 are baked (230° C., 1 hour), thereby the black matrixes 15 are completed.

It is widely known that when the oxygen passivation layer 21 is used, interface reaction occurs between the oxygen passivation layer 21 and the black matrix photoresist causing a mixing layer, thereby the black matrix pattern becomes cauliflower-like due to the difference of the development rate between the mixing layer and the black matrix photoresist which have been exposed. However, in this embodiment, side walls of the black matrixes 15 are protected by the color filters 13 from being sunk into by the development solution, therefore, a satisfactory black matrix pattern having smoothly tapered profiles (in which the cross-sectional area of the black matrix 15 gradually increases from the surface to the depths) could be obtained.

Thereafter, steps for forming the overcoat layer 14, the contact hole 11 and the pixel electrode 9 are executed in the same way as the first or second embodiment.

As described above, in the manufacturing method of a liquid crystal display device of the on-array color filter structure (i.e. the CF on TFT structure etc.) according to the third embodiment of the present invention, the oxygen passivation layer 21 is employed in the black matrix formation process, thereby the radicals which are generated in the exposure can be used effectively for the exposure and photo-polymerization of the black matrix photoresist. According to experiments conducted by the present inventors, the exposure could be reduced to 1/10 compared to the case where the oxygen passivation layer 21 is not used, and thereby the manufacturing throughput could be raised. By the superposition of the edges of the black matrixes 15 on the edges of the color filters 13, the cauliflower-like overhangs of the black matrix pattern due to the use of the oxygen passivation layer 21 can be avoided, and thereby black matrixes 15 having satisfactory profiles could be obtained.

As set forth hereinabove, in the liquid crystal display device of on-array color filter structure (in which switching elements (such as TFTs) and color filters are formed on a common substrate so as to have a large opening area ratio) according to the present invention, the black matrixes 15 are formed after the formation of the color filters 13, therefore, the residues of the color filter photoresists and the black matrix photoresist remaining in the contact hole openings can be reduced or eliminated. Therefore, the etching of the passivation layer 8 for forming the openings for the contact holes 11 can be executed easily and reliably, and the contact resistance of the contact hole 11 for connecting the lead electrode of the switching element and the pixel electrode 9 can be reduced, and thus a satisfactory active matrix substrate of on-array color filter structure can be obtained.

In addition to the reduction or elimination of the residues, the black matrixes 15 have not been formed at the points when the residue-removing steps for the red, green and blue color photoresists using UV rays are executed, and thus the UV cleaning process is not executed heavily on the black matrixes 15. Therefore, the deterioration of the resistance of the black matrix 15 is avoided, thereby the increase of the coupling capacitance between the black matrix 15 and signal lines can be avoided, and thereby the signal delay can be eliminated.

Further, the black matrixes 15 are formed so that the edge of the black matrix 15 touching the edge of the color filter 13 will be superposed on the edge of the color filter 13. Therefore, pattern flake-off of the black matrixes 15 can be eliminated, and thus the light leakage can be eliminated correctly.

By the manufacturing method of a liquid crystal display device according to the present invention, the liquid crystal display device having the above characteristics can be manufactured efficiently.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A liquid crystal display device comprising:
    a transparent insulator substrate;
    switching elements which are formed on the transparent insulator substrate;
    a passivation layer for passivating the switching elements;
    color filters of prescribed colors which are formed on the passivation layer so that no color filter will be formed in areas around contact holes;
    black matrixes as shields for preventing light leakage which are formed on the passivation layer after the formation of the color filters so as to cover at least the switching elements and so that no black matrix will be formed in areas around the contact holes;
    an overcoat layer which is formed on the color filters and the black matrixes;
    pixel electrodes which are formed on the overcoat layer;
    lead electrodes of the switching elements for being connected to corresponding pixel electrodes; and
    contact holes which are formed through the overcoat layer and the passivation layer for establishing connection between the pixel electrodes and lead electrodes of the switching elements.

2. A liquid crystal display device as claimed in claim 1, wherein the black matrixes are formed so that the edge of the black matrix touching the edge of the color filter will be superposed on the edge of the color filter.

3. A liquid crystal display device as claimed in claim 1, wherein the color filters are formed of pigments-dispersed photoresists.

4. A liquid crystal display device as claimed in claim 3, wherein the pigments-dispersed photoresists which are used for forming the color filters are acrylic pigments-dispersed photoresists.

5. A liquid crystal display device as claimed in claim 1, wherein the black matrixes are formed of a pigments-dispersed photoresist.

6. A liquid crystal display device as claimed in claim 5, wherein the pigments-dispersed photoresist which is used for forming the black matrixes is an acrylic pigments-dispersed photoresist.

7. A liquid crystal display device as claimed in claim 5, wherein carbon particles are employed as the pigments for the pigments-dispersed photoresist for the black matrixes.

8. A liquid crystal display device as claimed in claim 5, wherein carbon particles provided with insulation coatings are employed as the pigments for the pigments-dispersed photoresist for the black matrixes.

9. A liquid crystal display device as claimed in claim 5, wherein titanium oxide particles are employed as the pigments for the pigments-dispersed photoresist for the black matrixes.

10. A liquid crystal display device as claimed in claim 1, wherein the overcoat layer is formed of a transparent photoresist.

11. A liquid crystal display device as claimed in claim 10, wherein the transparent photoresist is a transparent acrylic photoresist.

12. A liquid crystal display device as claimed in claim 1, wherein the switching element is a TFT (Thin-Film Transistor), and the lead electrode is the drain electrode of the TFT.

13. A liquid crystal display device as claimed in claim 1, wherein the black matrixes are formed so as to be connected to each other across pixels which are arranged in a particular direction.

14. A manufacturing method of a liquid crystal display device comprising the steps of:
    a switching element formation step in which switching elements each of which having a lead electrode for being connected to a corresponding pixel electrode are formed on a transparent insulator substrate;
    a passivation layer formation step in which a passivation layer for passivating the switching elements is formed on the substrate on which the switching elements have been formed;
    a color filter formation step in which color filters of prescribed colors are formed on the passivation layer to predetermined patterns so that no color filter will be formed in areas around contact holes;
    a black matrix formation step in which black matrixes as shields for preventing light leakage are formed on the substrate on which the color filters have been formed so as to cover at least the switching elements and so that no black matrix will be formed in areas around the contact holes;
    an overcoat layer formation step in which an overcoat layer is formed on the substrate on which the color filters and the black matrixes have been formed, to a pattern having openings for the contact holes;
    a contact hole opening formation step in which openings for the contact holes are formed in the passivation layer by etching corresponding parts of the passivation layer; and
    a pixel electrode formation step in which the pixel electrodes are formed on the overcoat layer by depositing a transparent conductive layer on the patterned overcoat layer and on parts of the lead electrodes which have been exposed in the contact hole openings and thereafter patterning the transparent conductive layer to a predetermined pattern.

15. A manufacturing method of a liquid crystal display device as claimed in claim 14, wherein in the black matrix formation step, the black matrixes are formed so that the edge of the black matrix touching the edge of the color filter will be superposed on the edge of the color filter.

16. A manufacturing method of a liquid crystal display device as claimed in claim 14, wherein in the contact hole opening formation step, the etching of the passivation layer is executed using a photoresist patterned on the overcoat layer as a mask.

17. A manufacturing method of a liquid crystal display device as claimed in claim 14, wherein in the contact hole opening formation step, the etching of the passivation layer is executed using the patterned and hardened overcoat layer as a mask.

18. A manufacturing method of a liquid crystal display device as claimed in claim 17, wherein the etching of the passivation layer is executed by means of plasma etching using one or more selected from SF$_6$, He and O$_2$ as etching gasses.

19. A manufacturing method of a liquid crystal display device as claimed in claim 14, wherein the color filter formation step for each prescribed color includes:

a photoresist coating step;

a prebaking step;

an exposure step;

a development step; and a baking step.

20. A manufacturing method of a liquid crystal display device as claimed in claim 14, wherein in the color filter formation step, the color filters are formed of pigments-dispersed photoresists.

21. A manufacturing method of a liquid crystal display device as claimed in claim 20, wherein the pigments-dispersed photoresists which are used for forming the color filters are acrylic pigments-dispersed photoresists.

22. A manufacturing method of a liquid crystal display device as claimed in claim 14, wherein the black matrix formation step includes:

a photoresist coating step;

a prebaking step;

an exposure step;

a development step; and a baking step.

23. A manufacturing method of a liquid crystal display device as claimed in claim 22, wherein the exposure step is executed in a nitrogen gas atmosphere.

24. A manufacturing method of a liquid crystal display device as claimed in claim 14, wherein the black matrix formation step includes:

a photoresist coating step;

a prebaking step;

an exposure step;

a PEB (Post Exposure Bake) step;

a development step; and a baking step.

25. A manufacturing method of a liquid crystal display device as claimed in claim 24, wherein the exposure step is executed in a nitrogen gas atmosphere.

26. A manufacturing method of a liquid crystal display device as claimed in claim 14, wherein the black matrix formation step includes:

a photoresist coating step;

a first prebaking step;

an oxygen passivation layer coating step;

a second prebaking step;

an exposure step;

a PEB (Post Exposure Bake) step;

an oxygen passivation layer removing step;

a development step; and a baking step.

27. A manufacturing method of a liquid crystal display device as claimed in claim 26, wherein the exposure step is executed in a nitrogen gas atmosphere.

28. A manufacturing method of a liquid crystal display device as claimed in claim 26, wherein the oxygen passivation layer is formed of polyvinyl alcohol resin.

29. A manufacturing method of a liquid crystal display device as claimed in claim 14, wherein in the black matrix formation step, the black matrixes are formed of a pigments-dispersed photoresist.

30. A manufacturing method of a liquid crystal display device as claimed in claim 29, wherein the pigments-dispersed photoresist which is used for forming the black matrixes is an acrylic pigments-dispersed photoresist.

31. A manufacturing method of a liquid crystal display device as claimed in claim 29, wherein carbon particles are employed as the pigments for the pigments-dispersed photoresist for the black matrixes.

32. A manufacturing method of a liquid crystal display device as claimed in claim 29, wherein carbon particles provided with insulation coatings are employed as the pigments for the pigments-dispersed photoresist for the black matrixes.

33. A manufacturing method of a liquid crystal display device as claimed in claim 29, wherein titanium oxide particles are employed as the pigments for the pigments-dispersed photoresist for the black matrixes.

34. A manufacturing method of a liquid crystal display device as claimed in claim 29, wherein an initialization agent having high sensitivity for the "g", "h" and "i" lines is added to the pigments-dispersed photoresist for the black matrixes.

35. A manufacturing method of a liquid crystal display device as claimed in claim 14, wherein in the black matrix formation step, the black matrixes are formed so as to be connected to each other across pixels which are arranged in a particular direction.

36. A manufacturing method of a liquid crystal display device as claimed in claim 14, further comprising an HMDS (HexaMethylDiSilane) exposure step in which the substrate is exposed to an HMDS gas atmosphere before the color filter formation step.

37. A manufacturing method of a liquid crystal display device as claimed in claim 14, further comprising an HMDS (HexaMethylDiSilane) exposure step in which the substrate is exposed to an HMDS gas atmosphere before the black matrix formation step.

38. A manufacturing method of a liquid crystal display device as claimed in claim 14, wherein in the overcoat layer formation step, the overcoat layer is formed of a transparent photoresist.

39. A manufacturing method of a liquid crystal display device as claimed in claim 38, wherein the transparent photoresist is a transparent acrylic photoresist.

40. A manufacturing method of a liquid crystal display device as claimed in claim 14, wherein the switching element which is formed in the switching element formation step is a TFT (Thin-Film Transistor), and the lead electrode is the drain electrode of the TFT.

* * * * *